United States Patent
Alonso Ruiz et al.

(10) Patent No.: US 10,976,917 B2
(45) Date of Patent: *Apr. 13, 2021

(54) DEVICES AND METHODS FOR INTERACTING WITH AN APPLICATION SWITCHING USER INTERFACE

(71) Applicant: Apple Inc., Cupertino, CA (US)

(72) Inventors: Marcos Alonso Ruiz, San Francisco, CA (US); Chanaka G. Karunamuni, San Jose, CA (US); Brandon M. Walkin, San Francisco, CA (US); Shubham Kedia, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,902

(22) Filed: Apr. 27, 2020

(65) Prior Publication Data

US 2020/0326826 A1  Oct. 15, 2020

Related U.S. Application Data

(63) Continuation of application No. 16/145,085, filed on Sep. 27, 2018, now Pat. No. 10,635,294.

(Continued)

(51) Int. Cl.
*G06F 3/0488* (2013.01)
*G06F 3/0482* (2013.01)
(Continued)

(52) U.S. Cl.
CPC .......... *G06F 3/0488* (2013.01); *G06F 3/0482* (2013.01); *G06F 9/445* (2013.01); *G06F 3/041* (2013.01)

(58) Field of Classification Search
CPC ....... G06F 3/0488; G06F 3/0482; G06F 9/445
(Continued)

(56) References Cited

U.S. PATENT DOCUMENTS 9,891,811 B2 * 2/2018 Federighi .............. G06F 3/0488
9,898,642 B2 * 2/2018 Han ...................... G06F 21/31
(Continued)

FOREIGN PATENT DOCUMENTS

WO WO 2009/143076 A2 11/2009
WO WO 2016/200586 A1 12/2016

OTHER PUBLICATIONS

Jabohn, "How to Use the iOS 11 iPhone App Switcher", https://web.archive.org/web/20171002124836/https://www.macobserver.com/tips/quick-tip/use-ios-11-iphone-app-switcher (see comment from Jabohn posted Jul. 29, 2017, 6 pages.

(Continued)

*Primary Examiner* — William D Titcomb
(74) *Attorney, Agent, or Firm* — Morgan, Lewis & Bockius LLP

(57) ABSTRACT

An electronic device displays an application switching user interface. The device, while displaying the application switching user interface, detects a touch gesture by a contact. In response to the touch gesture: if the touch gesture includes movement by the contact in a first direction and started at a location that corresponds to an application representation corresponding to a respective application, the device closes the respective application; and, if the touch gesture includes movement by the contact in the first direction and started at a location that corresponds a predefined region in the application switching user interface that is outside of the representations of respective applications, the device ceases to display the application switching user interface and displays an application launching user interface.

33 Claims, 39 Drawing Sheets

Related U.S. Application Data

(60) Provisional application No. 62/679,953, filed on Jun. 3, 2018.

(51) Int. Cl.
*G06F 9/445* (2018.01)
*G06F 3/041* (2006.01)

(58) Field of Classification Search
USPC .......................................................... 715/863
See application file for complete search history.

(56) References Cited

U.S. PATENT DOCUMENTS

| | | | | |
|---|---|---|---|---|
| 10,037,138 | B2 * | 7/2018 | Bernstein | G06F 3/0486 |
| 10,203,866 | B2 * | 2/2019 | Karunamuni | G06F 3/0485 |
| 10,346,030 | B2 * | 7/2019 | Wells | G06F 3/0416 |
| 2011/0202872 | A1 | 8/2011 | Park | |
| 2013/0174179 | A1 | 7/2013 | Park et al. | |
| 2014/0282110 | A1 | 9/2014 | Chaudhri | |
| 2015/0135108 | A1 * | 5/2015 | Pope | G06F 3/0481 715/767 |
| 2016/0004430 | A1 * | 1/2016 | Missig | G06F 3/04845 715/863 |
| 2016/0070466 | A1 | 3/2016 | Chaudhri et al. | |
| 2018/0335921 | A1 * | 11/2018 | Karunamuni | G06F 3/0488 |
| 2018/0335939 | A1 * | 11/2018 | Karunamuni | G06F 8/38 |

OTHER PUBLICATIONS

Phonesandmore, "Samsung Galaxy Phones: How to Enable and Disable the Flashlight/Torch/Lamp?", http://youtu.be/LncKoRsowZY, Feb. 3, 2015, 3 pages.

Notice of Allowance, dated Jan. 8, 2020, received in U.S. Appl. No. 16/145,085, 9 pages.

Office Action, dated Aug. 29, 2018, received in Danish Patent Application No. 201870356, which corresponds with U.S. Appl. No. 16/145,085, 8 pages.

Office Action, dated Jan. 24, 2019, received in Danish Patent Application No. 201870356, which corresponds with U.S. Appl. No. 16/145,085, 3 pages.

Office Action, dated Apr. 12, 2019, received in Danish Patent Application No. 201870356, which corresponds with U.S. Appl. No. 16/145,085, 5 pages.

Office Action, dated Oct. 21, 2019, received in Danish Patent Application No. 201870356, which corresponds with U.S. Appl. No. 16/145,085, 3 pages.

Office Action, dated Dec. 4, 2019, received in Danish Patent Application No. 201870356, which corresponds with U.S. Appl. No. 16/145,085, 2 pages.

International Search Report pand Written Opinion, dated Sep. 18, 2019, received in International Application No. PCT/US2019/030579, which corresponds with U.S. Appl. No. 16/145,085, 14 pages.

Intention to Grant, dated May 20, 2020, received in Danish Patent Application No. 201870356, which corresponds with U.S. Appl. No. 16/145,085, 2 pages.

Patent, dated Nov. 6, 2020, received in Danish Patent Application No. 201870356, which corresponds with U.S. Appl. No. 16/145,085, 5 pages.

* cited by examiner

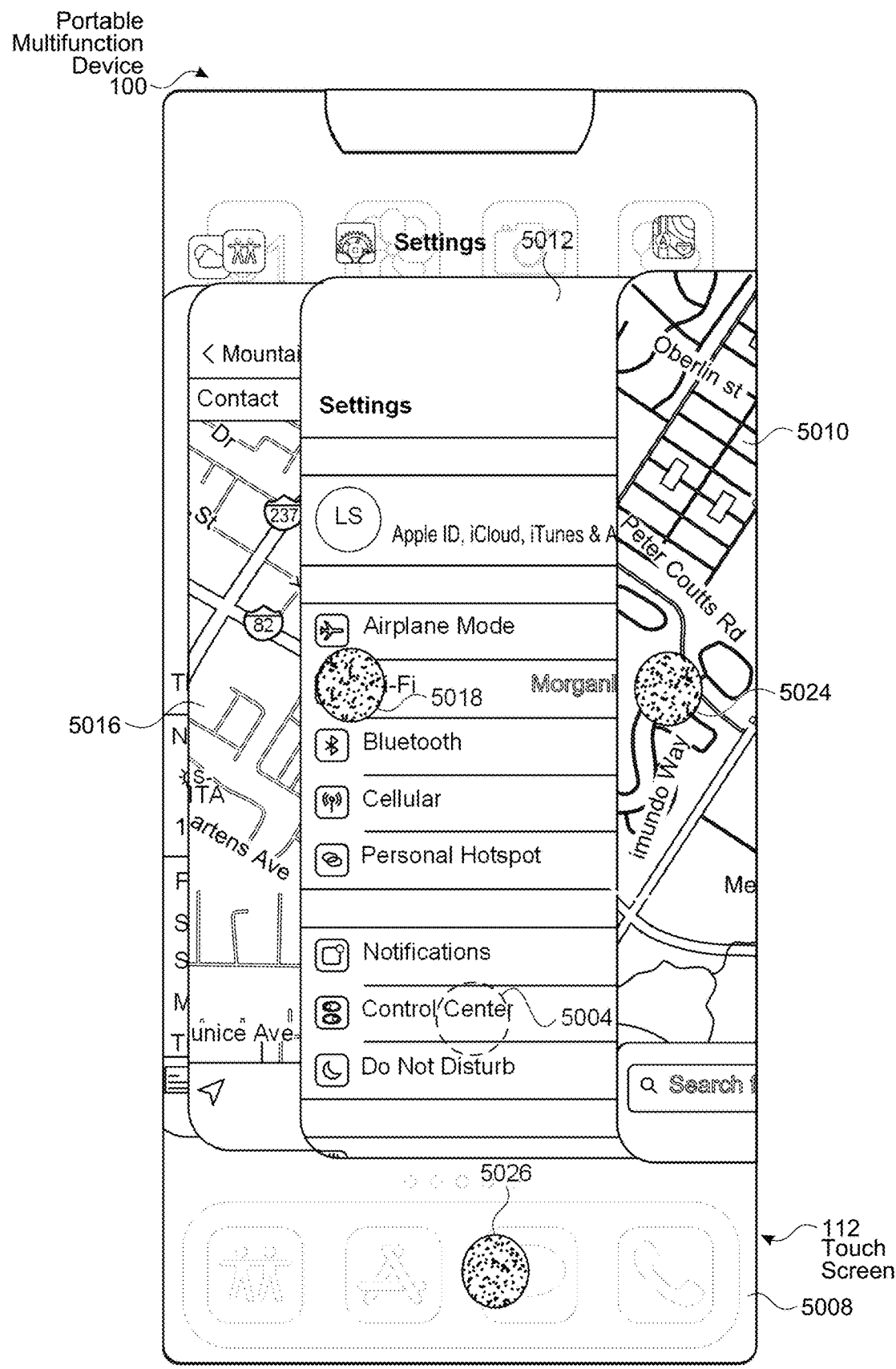
Figure 5E (Continue from Figure 5B)

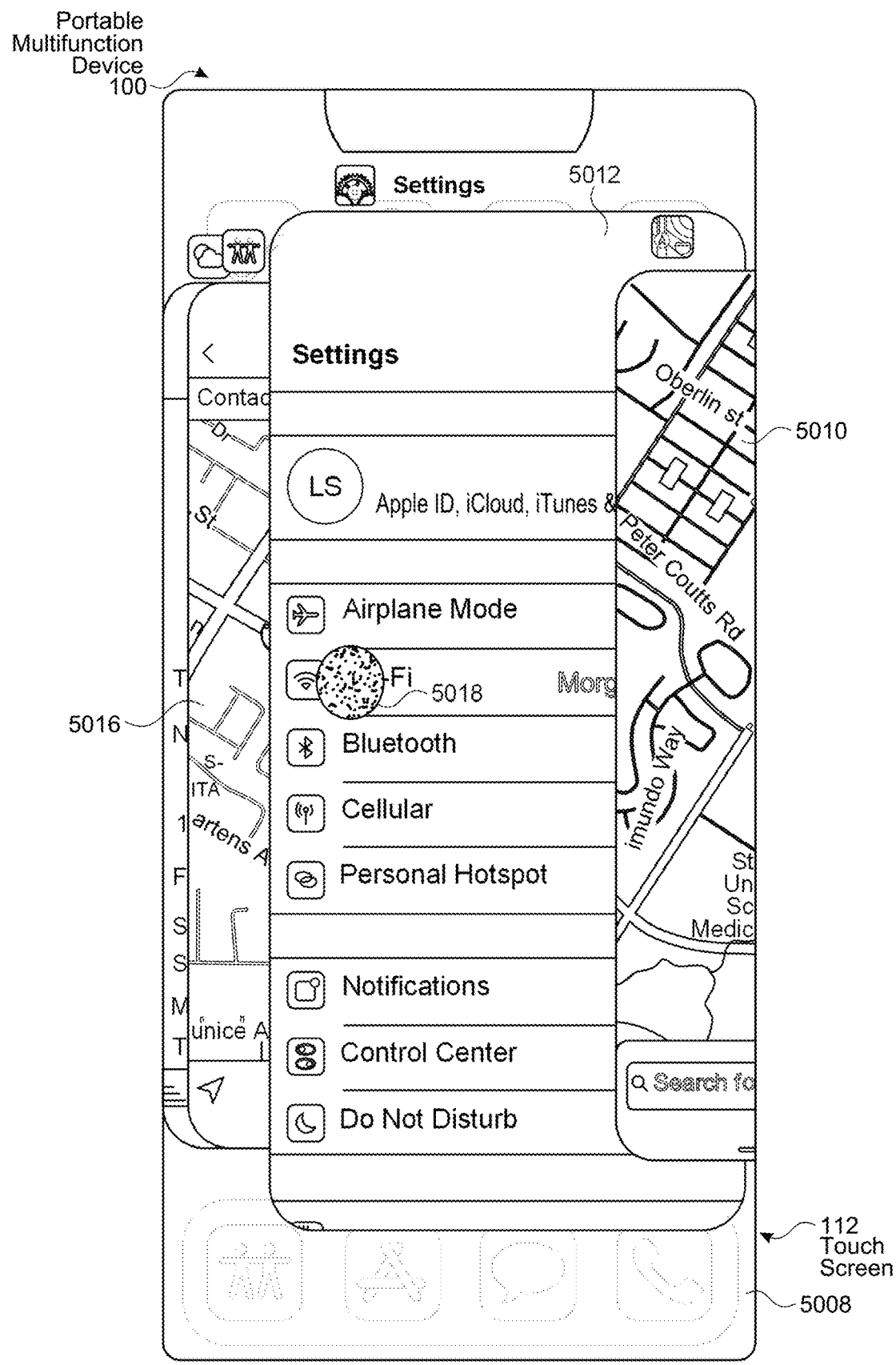
Figure 5H (Continue from Figure 5E)

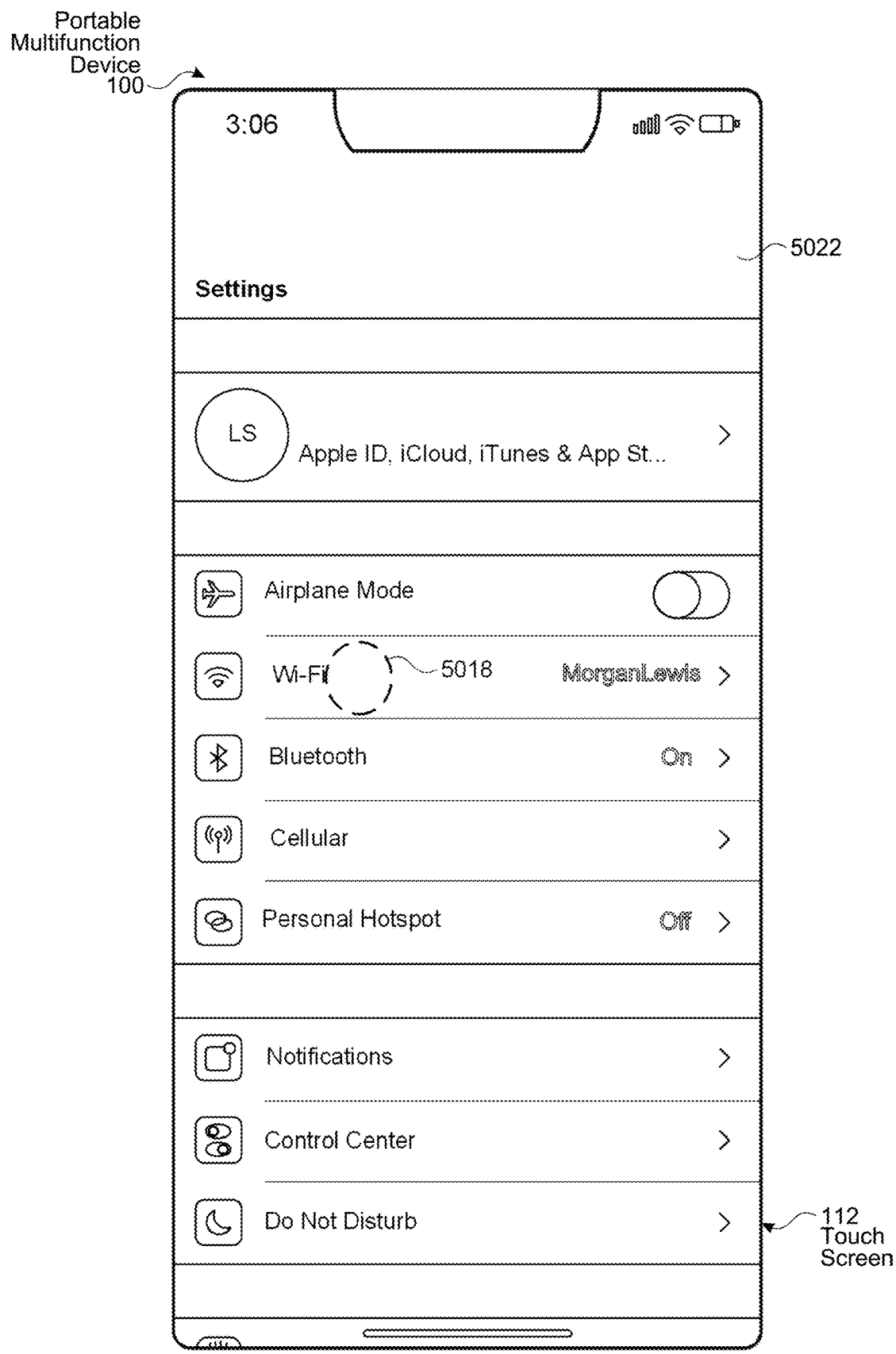
Figure 5L (Continue from Figure 5E or 5H)

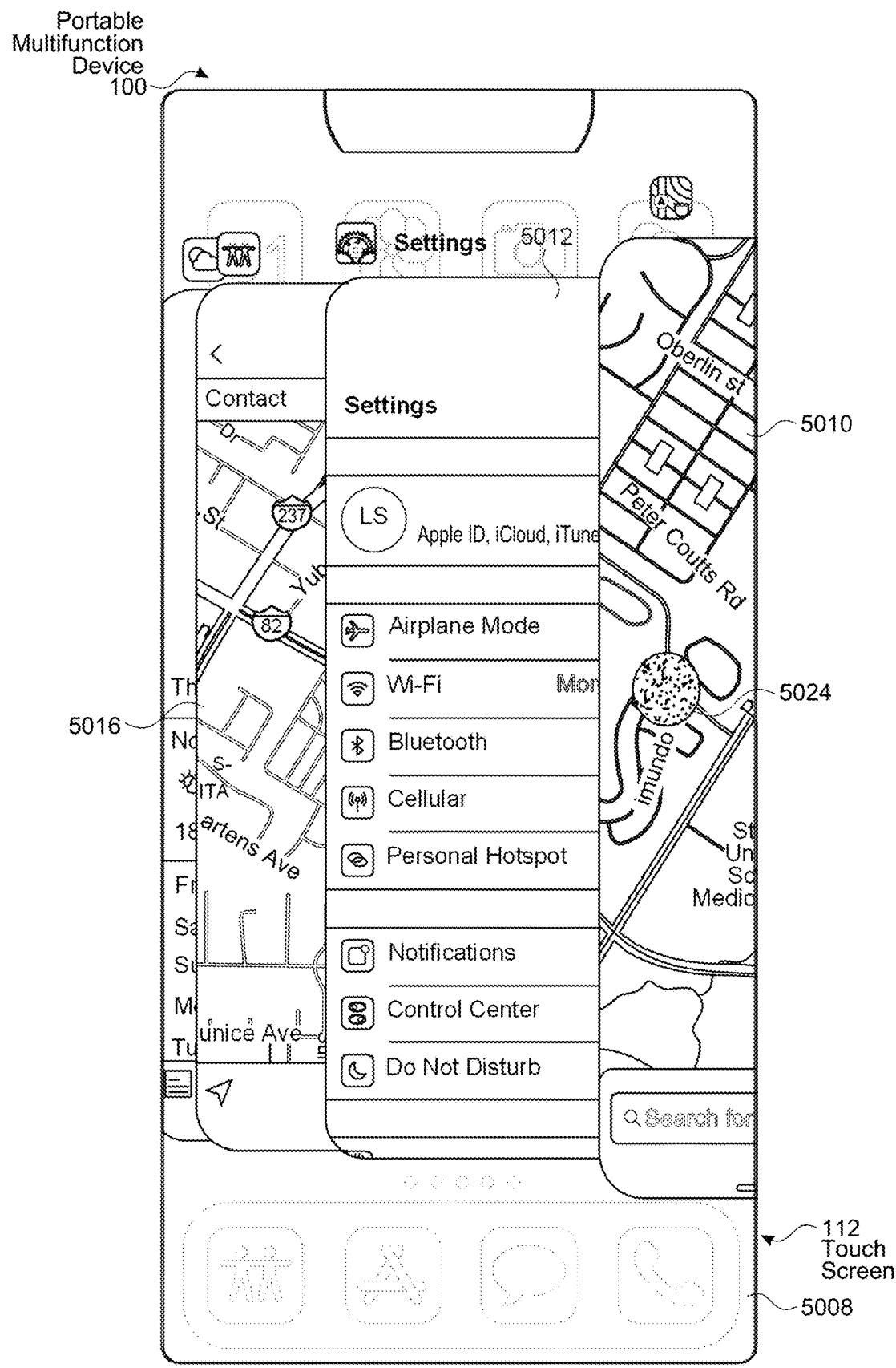
Figure 5M (Continue from Figure 5E)

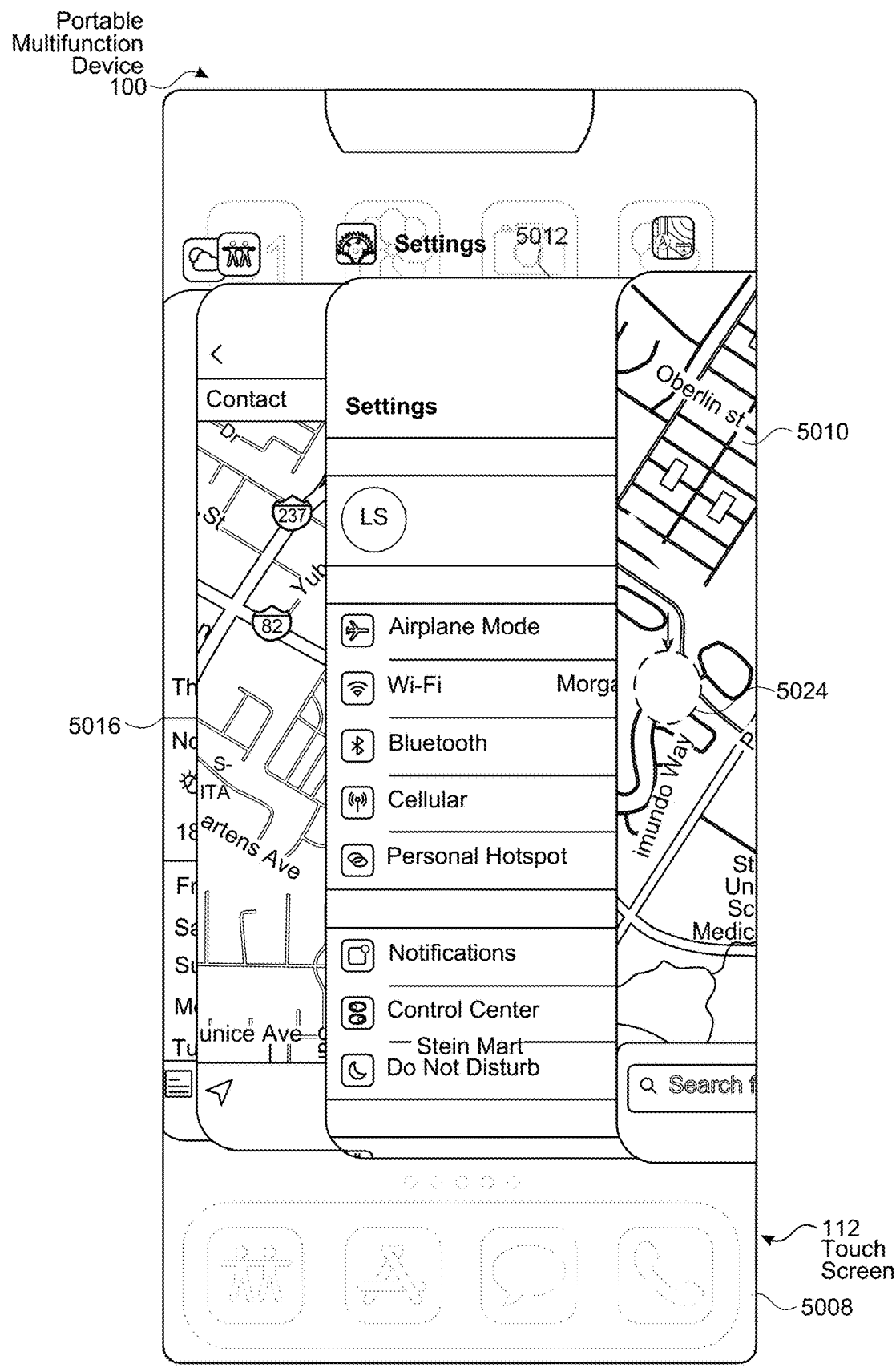
Figure 5P (Continue from Figure 5N)

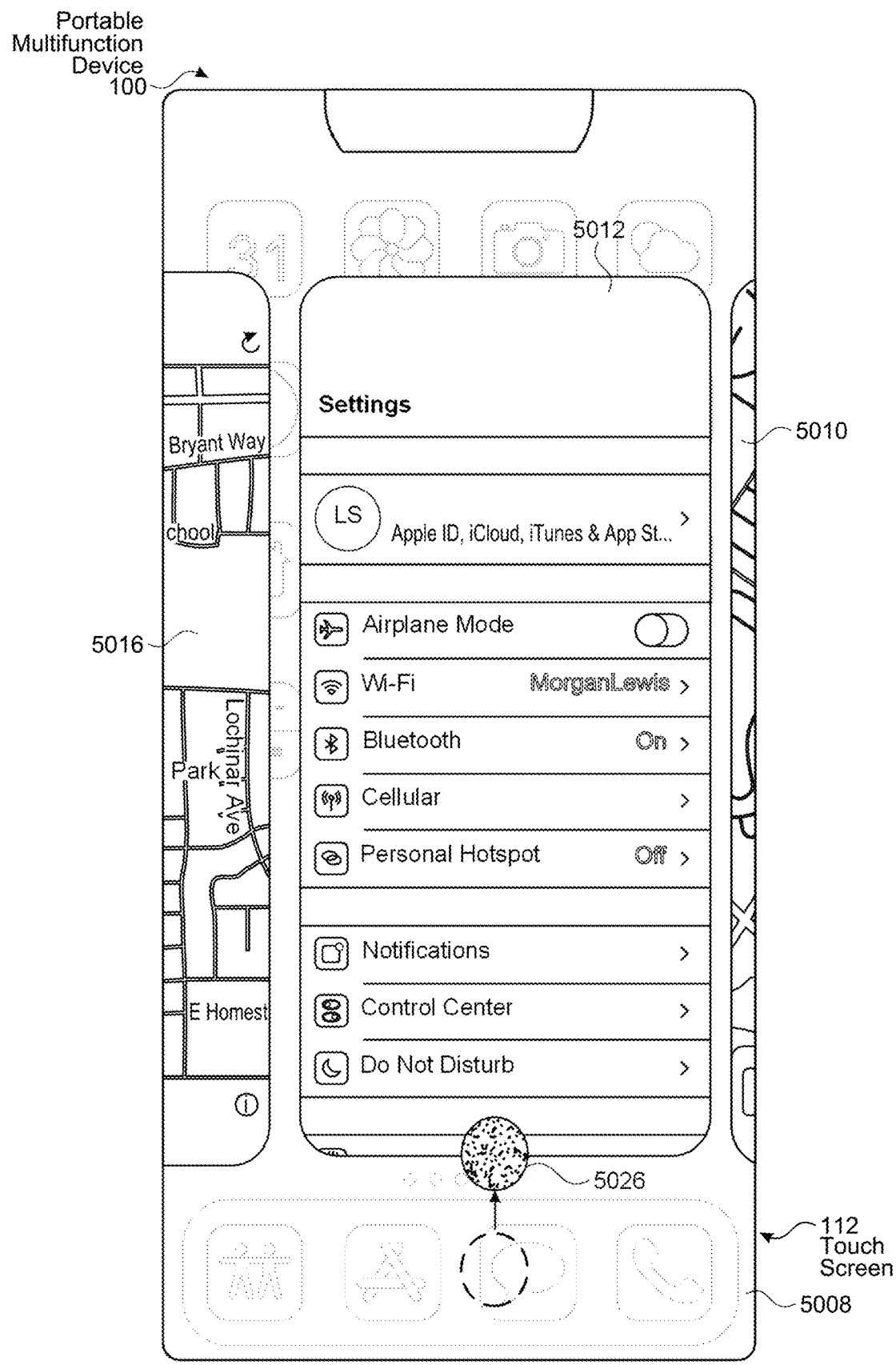
Figure 5Q (Continue from Figure 5E)

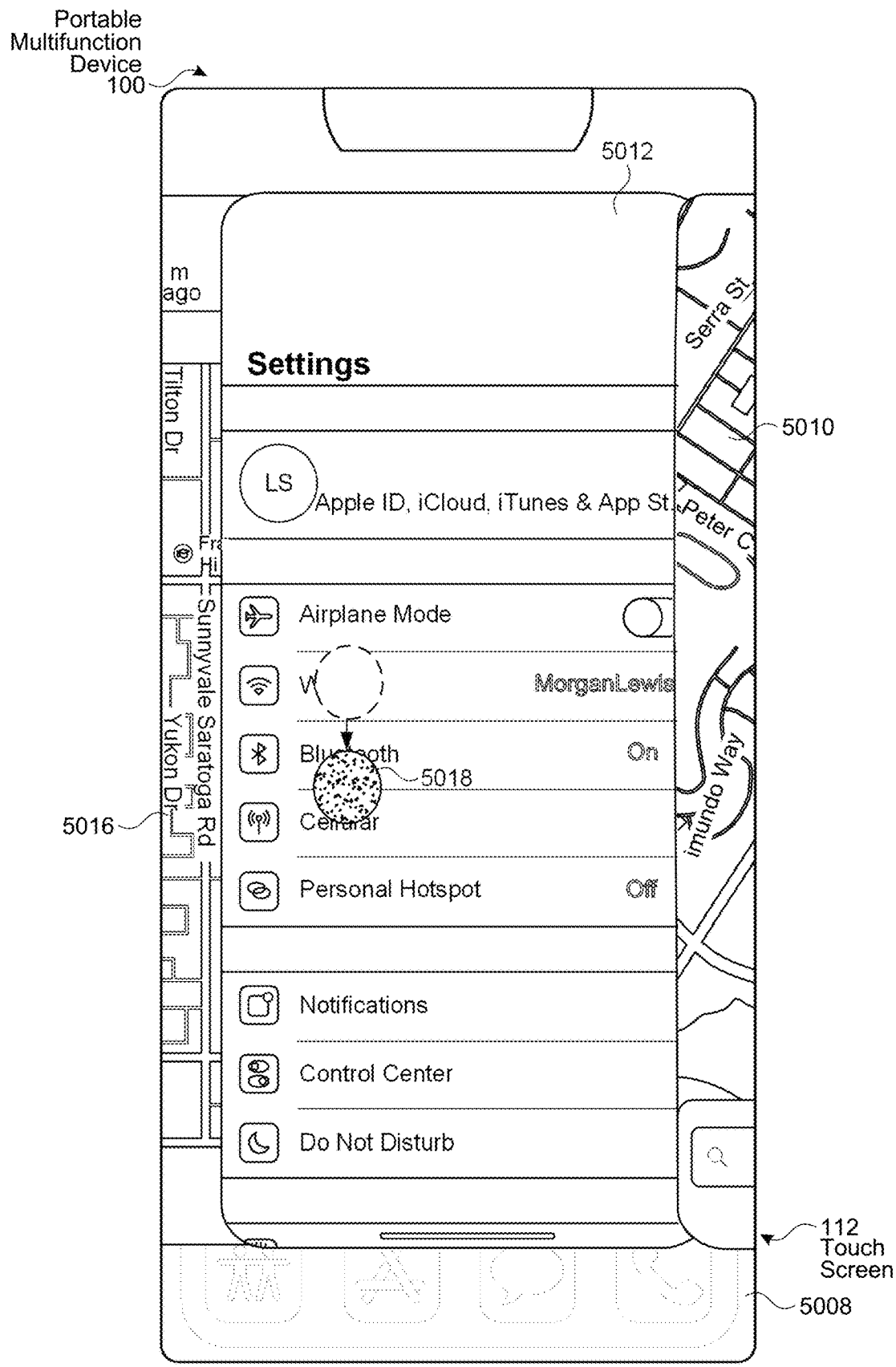
Figure 5U (Continue from Figure 5E or 5H)

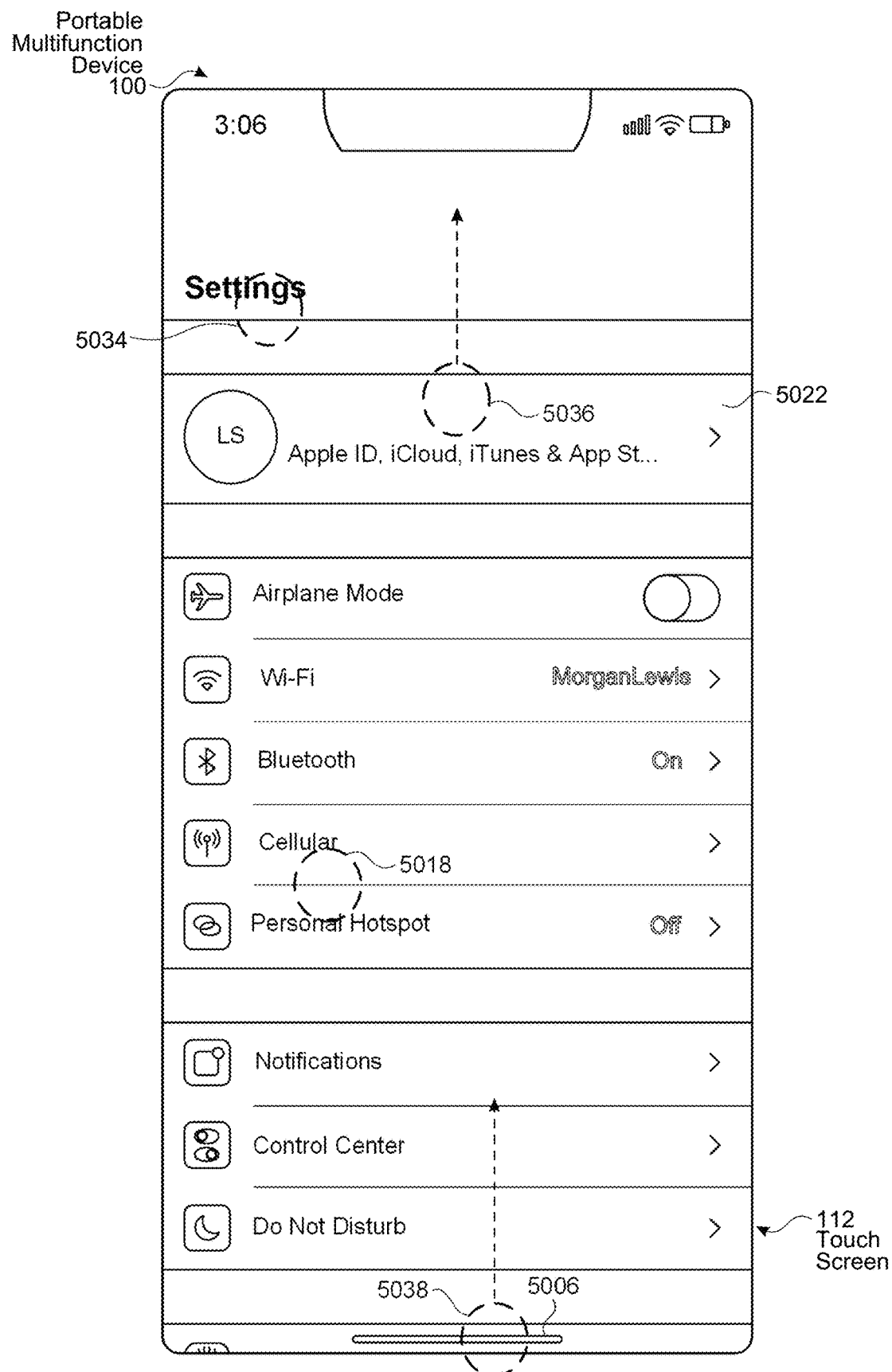
Figure 5Z (Continue from Figure 5V, 5X, or 5Y)

(A)

6018 While detecting the touch gesture by the contact:
    determine that the contact has been detected initially at a location that corresponds to a respective application representation; and,
    in response to determining that the contact has been detected initially at the location that corresponds to the respective application representation, enlarge the respective application representation 6010 In response to detecting the touch gesture by the contact:

6020 In accordance with a determination that the touch gesture started on a respective application representation and the touch gesture ended with the contact having moved less than a threshold amount from a starting position of the contact on the touch-sensitive surface, replace display of the application switching user interface with a user interface for the respective application 6022 In accordance with a determination that the touch gesture includes movement of the contact in a second direction that is different from the first direction, maintain display of the application switching user interface 6024 In accordance with a determination that the touch gesture starts at a location corresponding to a respective application representation and includes movement of the contact in a second direction that is different from the first direction, replace display of the application switching user interface with the user interface for the respective application, where the user interface for the respective application is shifted in a predefined direction 6026 Displaying the user interface for the respective application shifted in the predefined direction includes removing the user interface for the respective application from a predefined portion of the display, and the method includes:
    while displaying the user interface for the respective application shifted in the predefined direction, detecting a gesture at a location corresponding to the predefined portion of the display; and
    shifting the user interface for respective application back into the predefined portion of the display in accordance with the gesture (B)

6010 In response to detecting the touch gesture by the contact:

6028 In accordance with a determination that the touch gesture includes movement by the contact in a third direction that is different from the first direction, maintain display of the application switching user interface and scroll through application representations that are displayed in the application switching user interface 6030 In accordance with a determination that the touch gesture started at a location that corresponds to a respective application representation and includes movement of the contact, move the respective application representation in accordance with the movement of the contact.

6032 In accordance with a determination that the touch gesture started at a location that corresponds to a respective application representation and includes movement of the contact in the first direction, move the respective application representation in the first direction without moving other application representations in the first direction; and, In accordance with a determination that the touch gesture started at a location that corresponds to a location outside of the predefined region and includes movement of the contact in the first direction, concurrently move the respective application representation and one or more other applications representations in the first direction (C)

6010 In response to detecting the touch gesture by the contact:

6034 In accordance with a determination that the touch gesture started at a location that corresponds to a respective application representation and includes movement of the contact in the first direction, move the respective application representation without changing a size of the respective application representation in accordance with the movement of the contact in the first direction; and in accordance with a determination that the touch gesture started at a location that corresponds to a location outside of the predefined region and includes movement of the contact in the first direction, concurrently move the respective application representation and changing a size of the respective application representation in accordance with the movement of the contact in the first direction 6036 The application switching user interface includes a plurality of application representations that overlap with each other 6038 In accordance with a determination that the touch gesture started at a location that corresponds to a respective application representation and includes movement of the contact in the first direction, move the respective application representation while maintaining at least a portion of the overlapping of the plurality of application representations; and In accordance with a determination that the touch gesture started at a location that corresponds to a location outside of the predefined region and includes movement of the contact in the first direction, move the respective application representation and move and/ or resize one or more of the application representations to eliminate overlap between the plurality of application representations

Figure 6D

DEVICES AND METHODS FOR INTERACTING WITH AN APPLICATION SWITCHING USER INTERFACE

RELATED APPLICATIONS

This application is a continuation of U.S. patent application Ser. No. 16/145,085, filed Sep. 27, 2018, which claims priority to U.S. Provisional Application Ser. No. 62/679,953, filed Jun. 3, 2018, which is incorporated by reference herein in its entirety.

TECHNICAL FIELD

This relates generally to electronic devices with touch-sensitive surfaces, including but not limited to electronic devices with touch-sensitive surfaces that provide an application switching user interface, and more particularly, to devices and methods for interacting with the application switching user interface.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to select, launch, and manage software applications.

For portable electronic devices, existing methods for managing multiple recently used applications are cumbersome and inefficient. For example, portable devices with small screens (e.g., smart phones and other pocket-sized devices) typically display a single application at a time. With such devices, a user may have difficulty seeing and managing multiple recently used applications. This situation creates a significant cognitive burden on a user. In addition, existing methods for managing recently used applications take longer than necessary, thereby wasting energy. This latter consideration is particularly important in battery-operated devices.

SUMMARY

Accordingly, there is a need for computing devices with faster, more efficient methods and interfaces for managing recently used applications. Such methods and interfaces may complement or replace conventional methods for managing recently used applications. Such methods and interfaces reduce the cognitive burden on a user and produce a more efficient human-machine interface. For battery-operated computing devices, such methods and interfaces conserve power and increase the time between battery charges.

An application switching user interface displays representations of multiple recently used applications, e.g., arranged in accordance with relative recency of the last use of each of the applications. Existing methods of interacting with the application switching user interface are very limited, e.g., the user can only select an application to display the application or remove an application from the application switching user interface, or close the application switching user interface to return to a last displayed user interface. The above deficiencies and other problems associated with managing recently used applications using conventional application switching user interface are reduced or eliminated by the disclosed electronic devices.

In some embodiments, the device includes a desktop computer. In some embodiments, the device is portable (e.g., a notebook computer, tablet computer, or handheld device). In some embodiments, the device includes a personal electronic device (e.g., a wearable electronic device, such as a watch). In some embodiments, the device has (and/or is in communication with) a display generation component and one or more input devices. In some embodiments, the device has (and/or is in communication with) a touchpad. In some embodiments, the device has (and/or is in communication with) a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive display. The method includes displaying, on the display, an application. The method further includes, while displaying the application on the display, detecting an input that corresponds to a request to display an application switching user interface; and in response to detecting the input that corresponds to the request to display the application switching user interface, displaying an application switching user interface that includes representations of a plurality of recently used applications, including a first application representation that corresponds to a first application and a second application representation that corresponds to a second application. The method further includes: while displaying the application switching user interface, detecting a touch gesture by a contact on the touch-sensitive surface; and, in response to detecting the touch gesture: in accordance with a determination that the touch gesture includes movement by the contact in a first direction and started at a location that corresponds to the first application representation, closing the first application; in accordance with a determination that the touch gesture includes movement by the contact in the first direction and started at a location that corresponds to the second application representation, closing the second application; and, in accordance with a determination that the touch gesture includes movement by the contact in the first direction and started at a location that corresponds a predefined region in the application switching user interface that is outside of the first application representation and the second application representation, ceasing to display the application switching user interface and displaying an application launching user interface that is different from the application switching user interface.

In accordance with some embodiments, an electronic device includes a display, an optional touch-sensitive surface, one or more optional sensors to detect intensities of contacts with the touch-sensitive surface, one or more processors, memory, and one or more programs. The one or more programs are stored in the memory and configured to be executed by the one or more processors. The one or more programs include instructions for performing the operations of any of the methods described herein. In accordance with some embodiments, a computer readable storage medium has stored therein instructions which when executed by an electronic device with a display, an optional touch-sensitive surface, and one or more optional sensors to detect intensities of contacts with the touch-sensitive surface, cause the device to perform the operations of any of the methods described herein. In accordance with some embodiments, a graphical user interface on an electronic device that includes memory and one or more processors to execute one or more programs stored in the memory includes one or more of the elements displayed in any of the methods described herein, which are updated in response to inputs, as described in any of the methods described herein. In accordance with some embodiments, an electronic device includes a display, an optional touch-sensitive surface, one or more optional sensors to detect intensities of contacts with the touch-sensitive surface, and means for performing the operations of any of the methods described herein. In accordance with some embodiments, an information processing apparatus, for use in an electronic device that includes a display, an optional touch-sensitive surface, and one or more optional sensors to detect intensities of contacts with the touch-sensitive surface, includes means for performing the operations of any of the methods described herein.

Thus, electronic devices are provided with faster, more efficient methods and interfaces for integrating video with user interface navigation, thereby increasing the effectiveness, efficiency, and user satisfaction with such devices. Such methods and interfaces may complement or replace conventional methods for integrating video with user interface navigation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams illustrating a method of interacting with an application switching user interface, in accordance with some embodiments.

DESCRIPTION OF EMBODIMENTS

The methods, devices, and GUIs described herein improve interaction and functionality of the application-switching user interface in multiple ways.

In some embodiments, while an application switching user interface is displayed, a swipe gesture by a contact detected on a touch-sensitive surface of the device causes the device to perform different operations depending on various characteristics of the swipe gesture (e.g., the direction of the swipe gesture, movement speed and/or distance of the contact, and/or starting and/or end locations of the swipe gesture). In particular, in some embodiments, an upward swipe gesture that starts from a location corresponding to a representation of a respective application in the application switching user interface causes the device to close the respective application, while an upward swipe that starts from a location that is not occupied by the representation of any application in the application switching user interface causes the device to navigate to an application launching user interface (e.g., a home screen user interface). In addition, in some embodiments, a sideway swipe gesture detected on the application switching user interface (e.g., movement of contact corresponds to a movement across the representation(s) of one or more applications) causes the device to scroll through the representations of applications in the application switching user interface. In some embodiments, a downward swipe gesture at a location on the touch-sensitive surface that corresponds to a representation of a respective application in the application switching user interface causes the device to either display the respective application in a default mode (e.g., full-screen mode) (e.g., when first criteria are met by the downward swipe gesture) or display the respective application in an enhanced-reachability mode (e.g., shifted down on the display) (e.g., when second criteria are met by the downward swipe gesture).

Figure 5A:
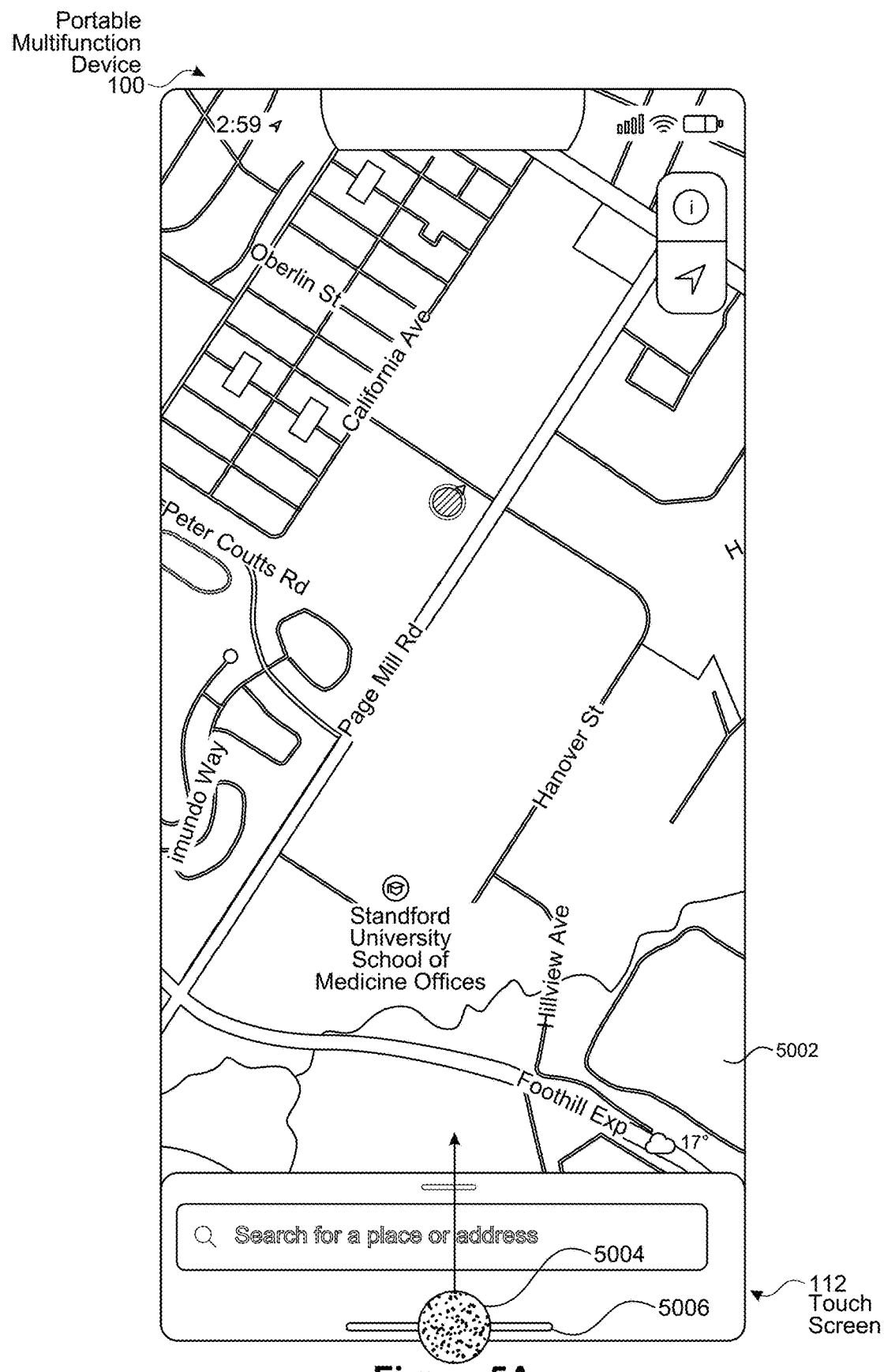
FIGS. 5A-5Z illustrate example user interfaces for integrating an application switching user interface, in accordance with some embodiments.

Below, FIGS. 1A-1B, 2, and 3 provide a description of example devices. FIGS. 5A-5Z illustrate example user interfaces for interacting with an application switching user interface. FIGS. 6A-6D are flow diagrams illustrating a method of application switching user interface. The user interfaces in FIGS. 5A-5Z are used to illustrate the processes in FIGS. 6A-6D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
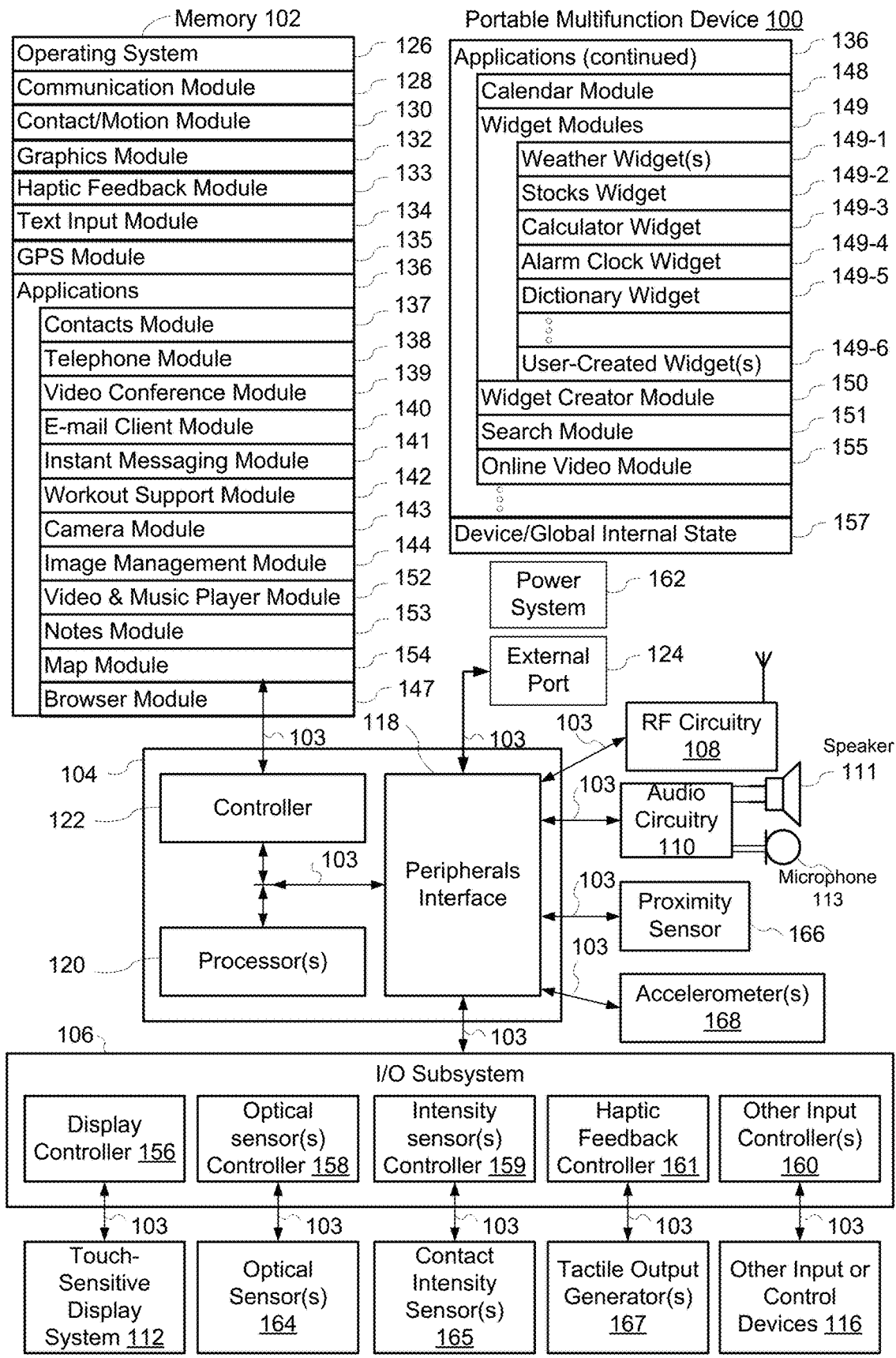
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
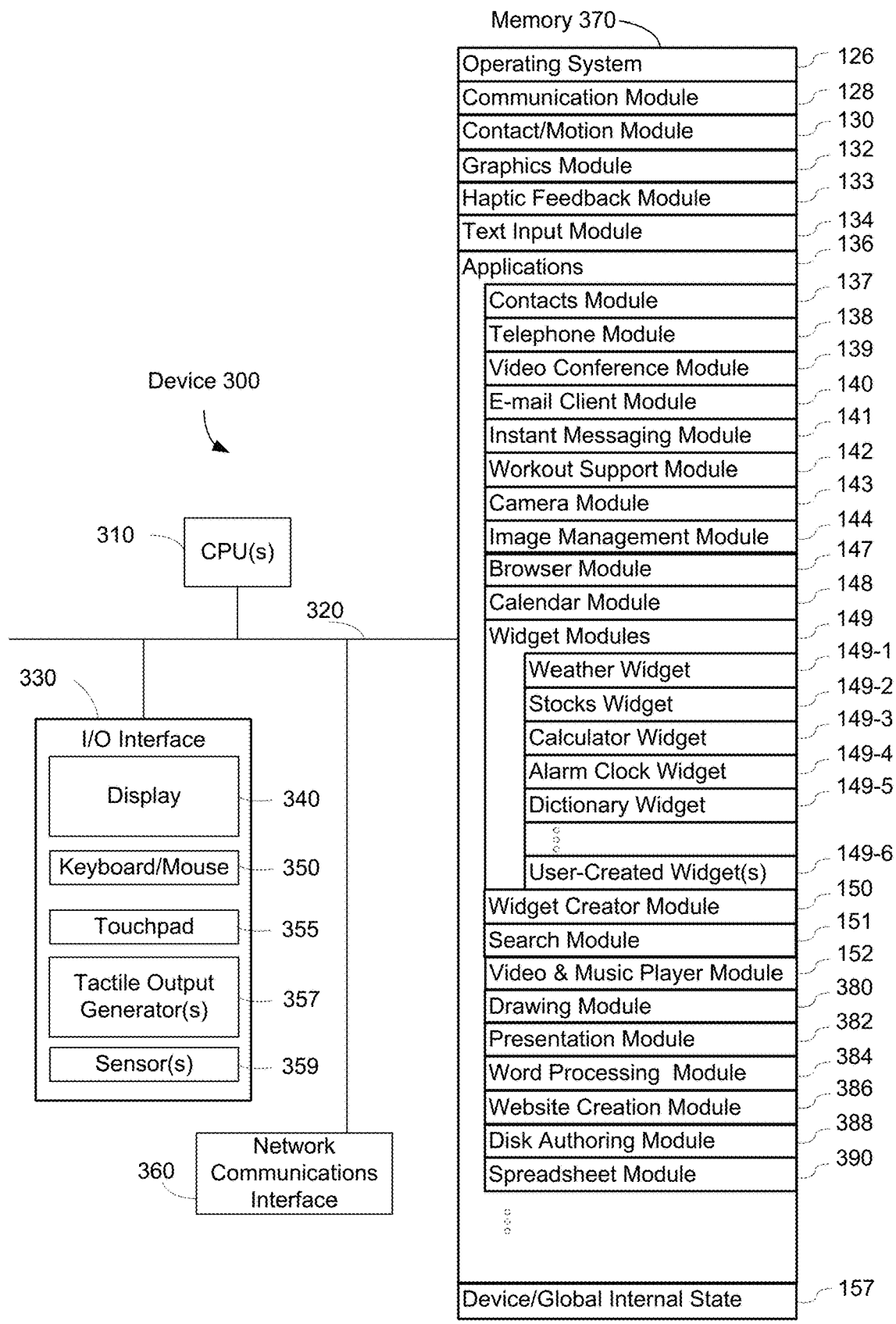
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed.

As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
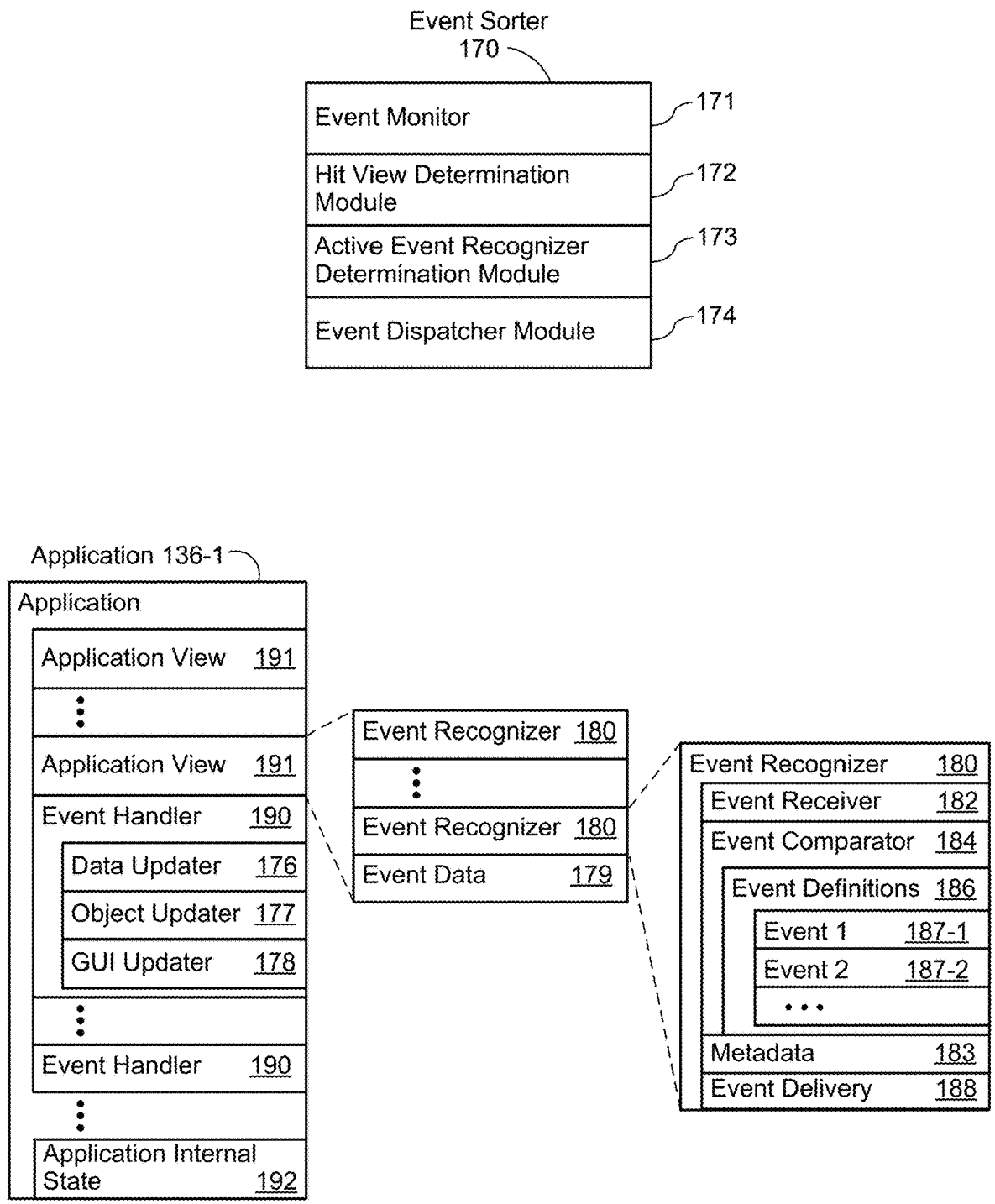
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
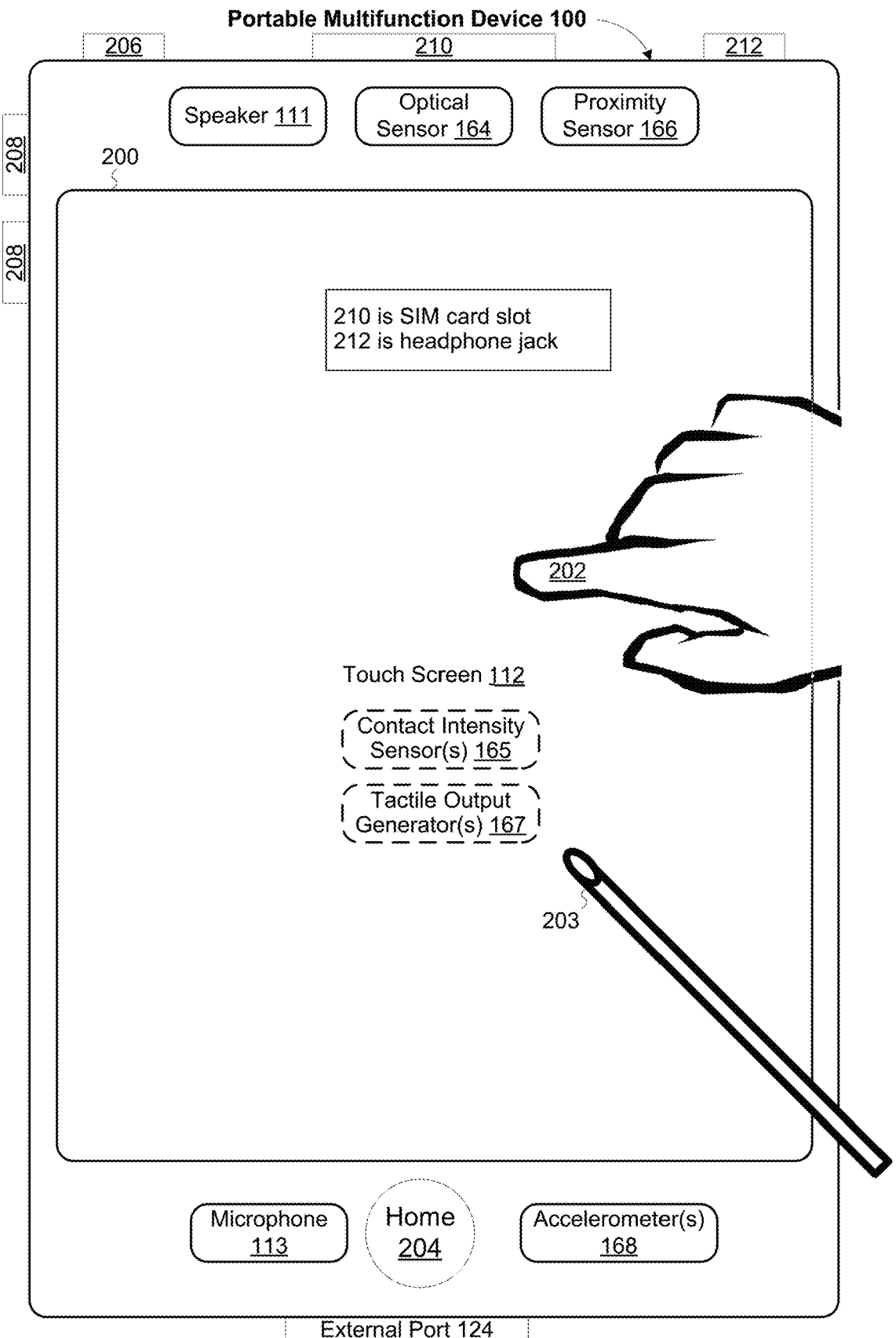
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
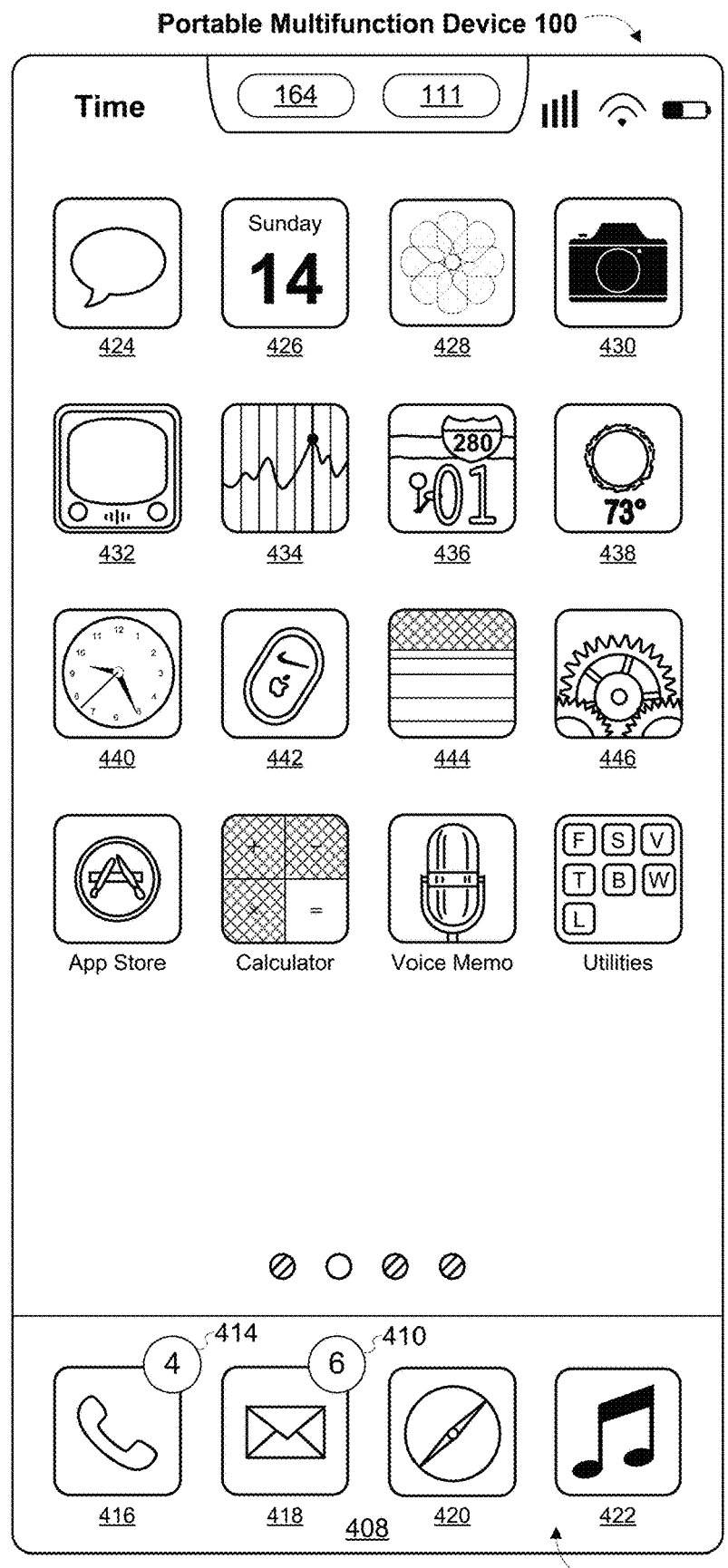
FIG. 4A illustrates an example user interface for a menu of applications on a portable multifunction device in accordance with some embodiments.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) for wireless communication(s), such as cellular and Wi-Fi signals;
  Time;
  a Bluetooth indicator;
  a Battery status indicator;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, labeled "Music;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
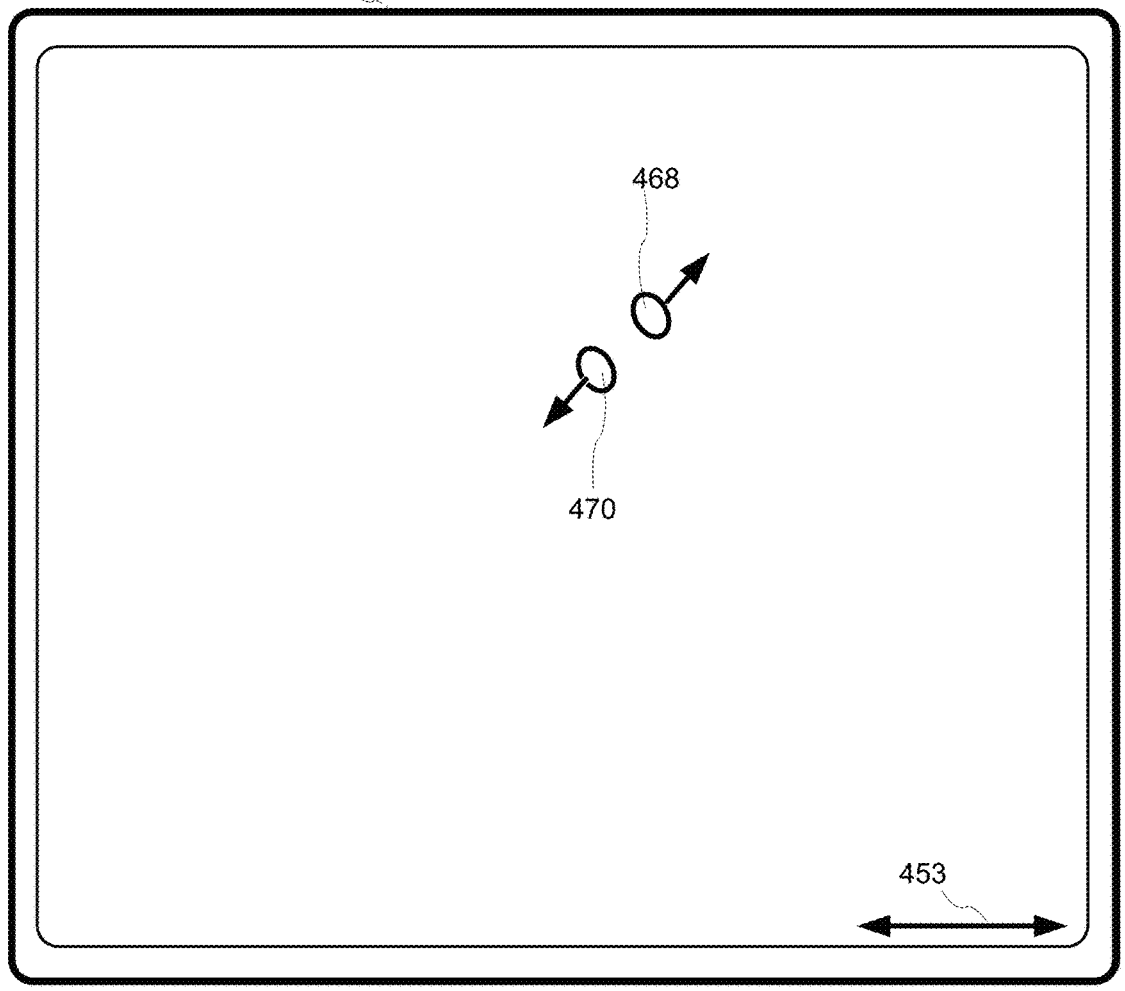
FIG. 4B illustrates an example user interface for a multifunction device with a touch-sensitive surface that is separate from the display in accordance with some embodiments.
Figure 4B:
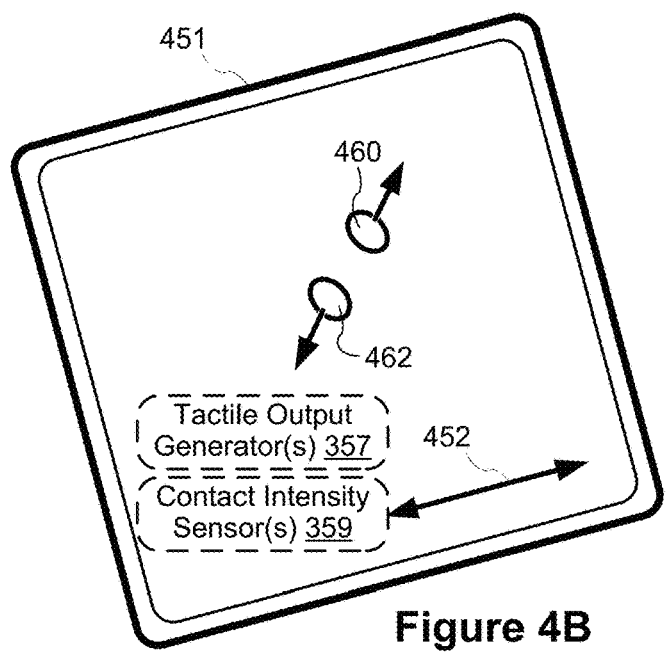

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
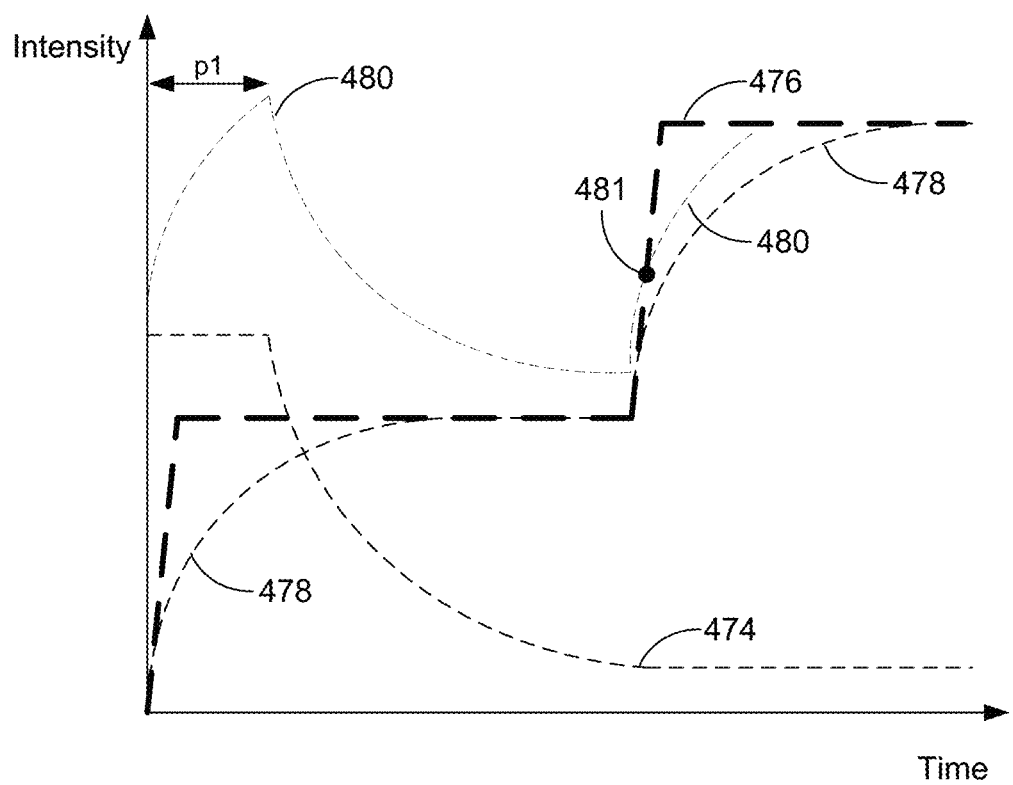
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
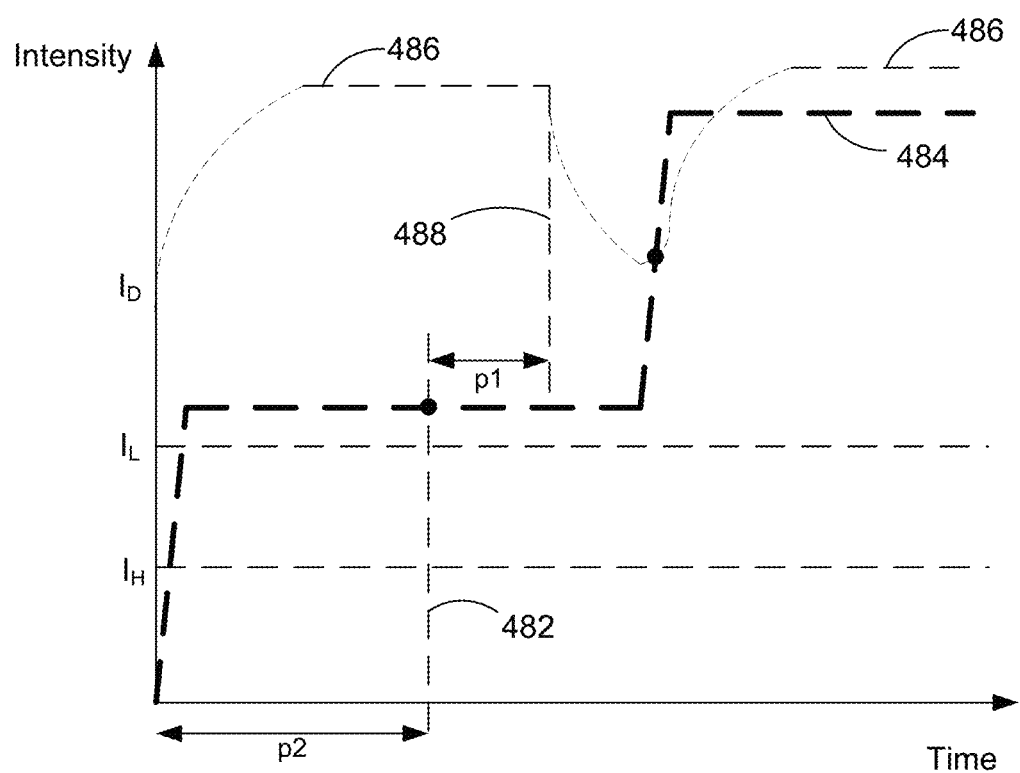

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
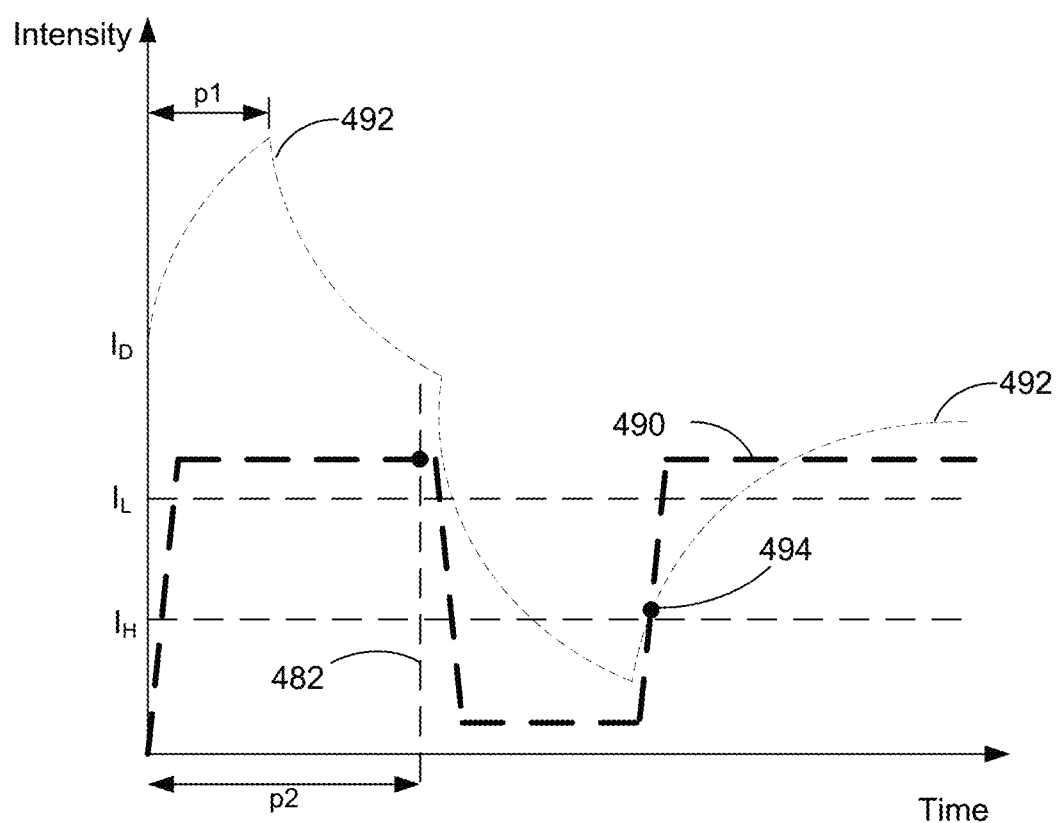

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5Z illustrate example user interfaces for interacting with an application switching user interface, in accordance with some embodiments. The user interfaces in these figures are used to illustrate the processes described below, including the processes in FIGS. 6A-6D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5D illustrate an upward swipe gesture that causes the device to navigate from a user interface of an application to an application launching user interface, in accordance with some embodiments.

In FIG. 5A, the device displays a user interface (e.g., user interface 5002) of a maps application in a default full-screen mode (e.g., user interface 5002 occupying substantially all of touch-screen 112). The device detects a contact (e.g., contact 5004) in a bottom edge region of touch-screen 112. Before the contact is detected, the device displays an indicator (e.g., home affordance 5006) in the bottom edge region of touch-screen 112 to indicate the location of the bottom edge region of touch-screen 112 for detecting an edge swipe gesture.

Figure 5B:
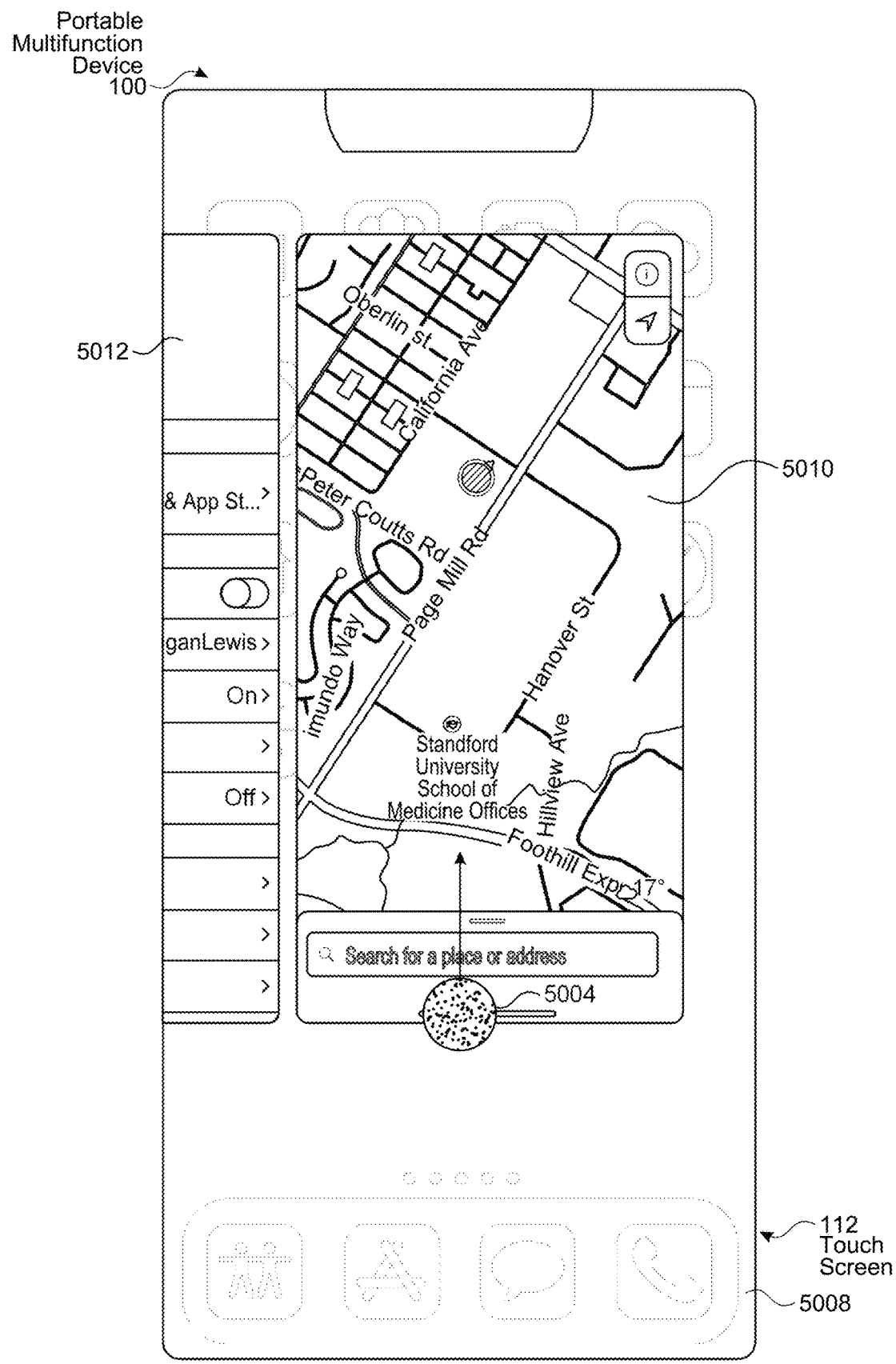

In FIGS. 5A-5B, the device detects upward movement of contact 5004 from the bottom edge of touch screen 112; and in accordance to the upward movement of contact 5004, the device reduces the size of user interface 5002 of the maps application and transforms user interface 5002 into an application representation of the maps application (e.g., card 5010 including a snapshot of the user interface 5002). Card 5010 is displayed on a background (e.g., background 5008 (e.g., a blurred image of home screen user interface 5014 (FIG. 5D))) in a navigation user interface that has multiple possible destination states (e.g., destination states corresponding to different user interfaces, such as an application switching user interface, an application launching user interface, an application user interface of a previous/next application or the currently application). The device moves card 5010 with contact 5004 on background 5008 of the navigation user interface. In accordance with a determination that the criteria for navigating to an application switching user interface are met by the movement of contact 5004 (e.g., a movement parameter of the movement of contact 5004 exceeds a first threshold value (e.g., more than a first threshold distance in the upward direction, or movement followed by a pause of contact 5004)), the device displays another card 5012 (e.g., an application representation of a settings application) next to card 5010 on background 5008, to indicate that the criteria for navigating to the application switching user interface are met and that the device would navigate to the application switching user interface if lift-off of contact 5004 were detected at this moment. As contact 5004 moves upward on touch screen 112, cards 5010 and 5012 move upward in unison with contact 5004, and reduce in size in accordance with the cards' (or the contact's) distance away from the bottom edge of the touch screen. Card 5012 represents an application that was last opened prior to the maps application.

Figure 5C:
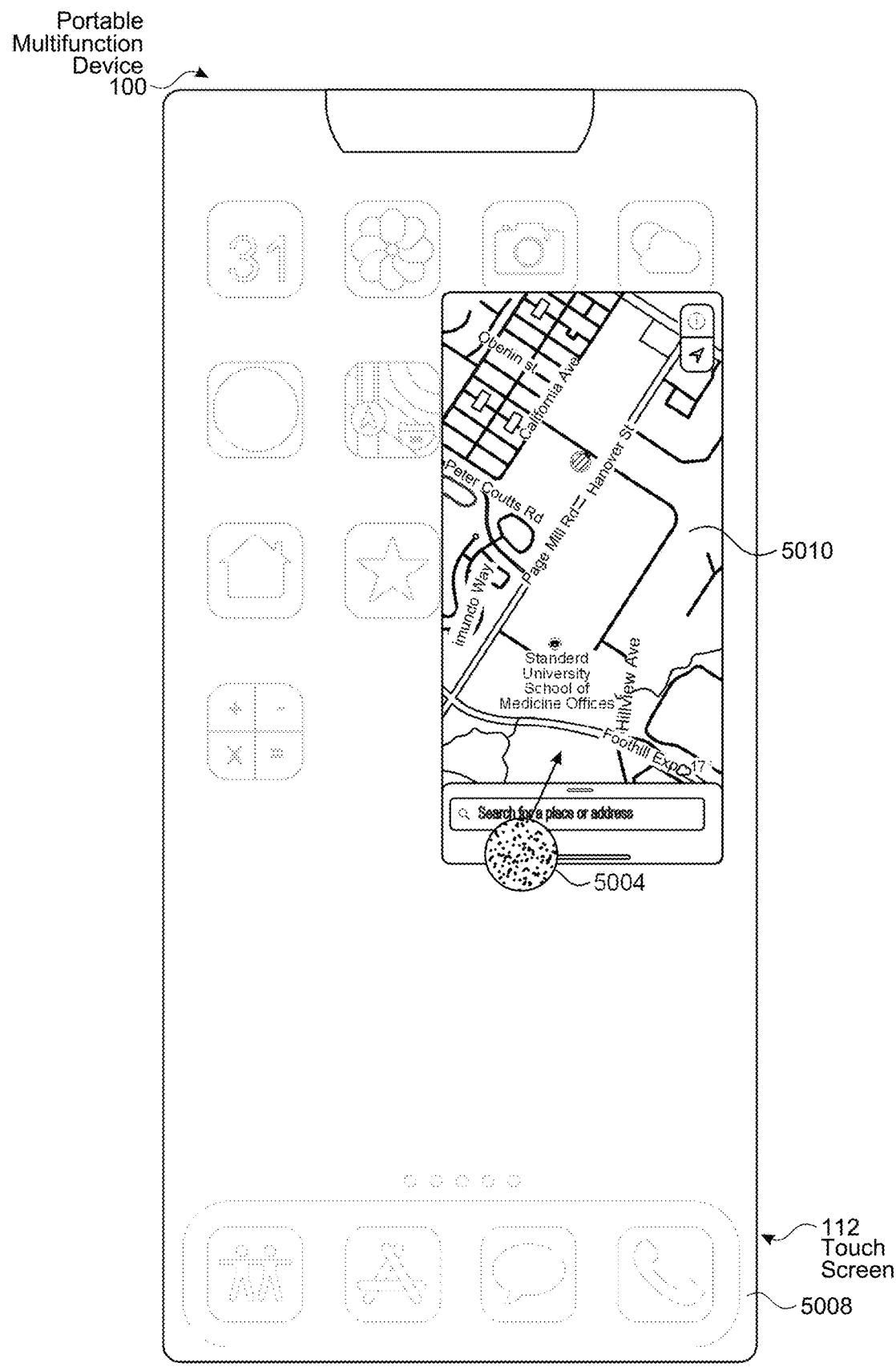

In FIGS. 5B-5C, as contact 5004 continues to move upward and drags cards 5010 and 5012 across background 5008 in the navigation user interface, the device detects that the criteria for navigating to an application launching user interface (e.g., a home screen user interface) are met (e.g., a movement parameter of the movement of contact 5004 exceeds a second threshold value (e.g., more than a second threshold distance greater than the first threshold distance in the upward direction, or movement speed of contact 5004 exceeded a threshold speed)). In accordance with a determination that the criteria for navigating to the application launching user interface are met, the device removes card 5012 from display, leaving only card 5010 that continues to move with contact 5004 on background 5008. As contact 5004 drags card 5010 across the navigation user interface, card 5010 changes in size in accordance with its distance away from the bottom edge of the touch-screen (e.g., shrinks with increasing distance from the edge).

Figure 5D:
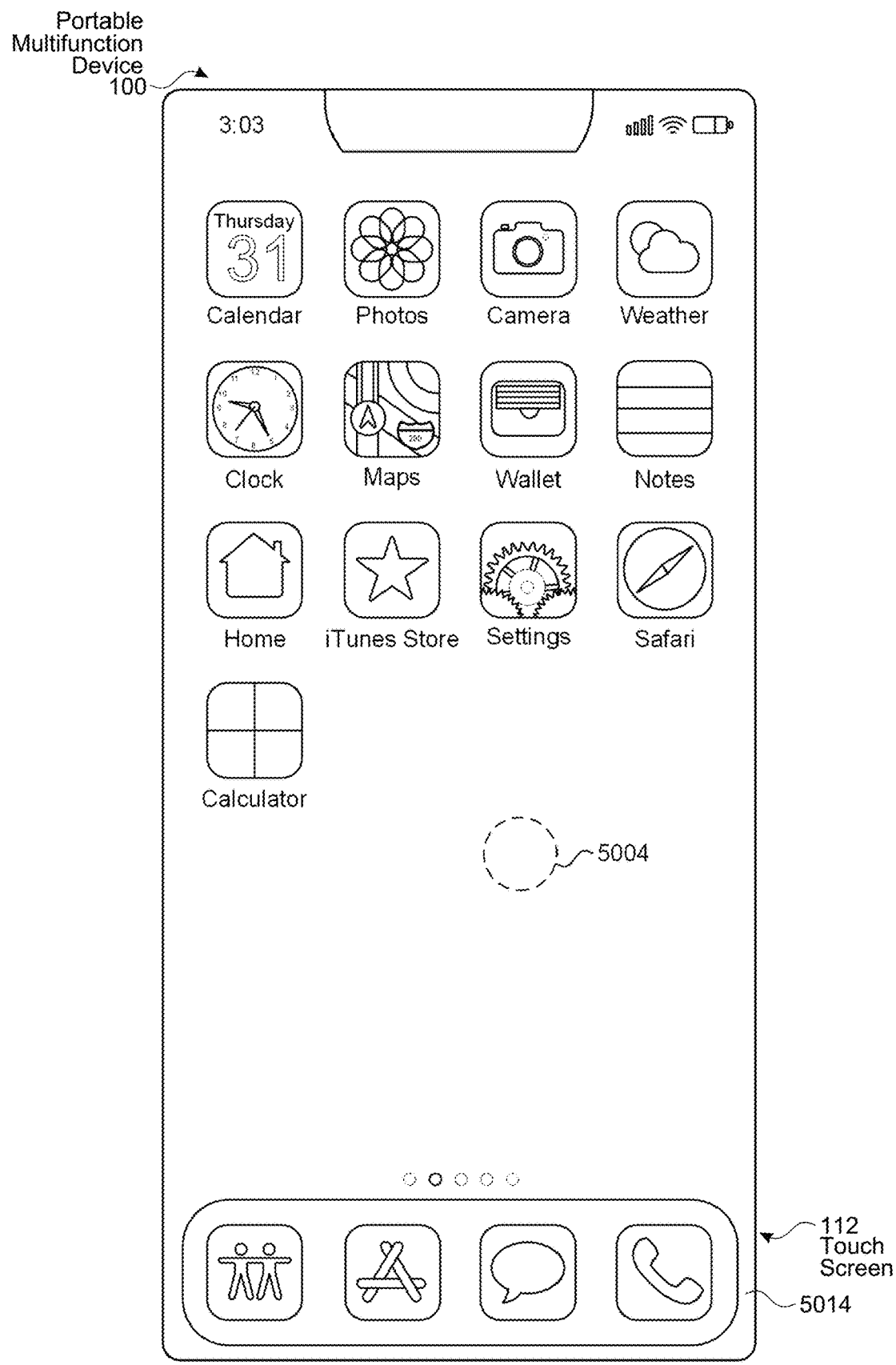

In FIGS. 5C-5D, the device detects lift-off of contact 5004 while card 5010 is still the only card present on the touch-screen (e.g., in the state as shown in FIG. 5C) (e.g., the criteria for navigating to the application launching user interface are still met, and the criteria for navigating to the application switching user interface are no longer met). In response to detecting the lift-off of contact 5004 (e.g., lift-off location of contact 5004 is indicated by dashed lines over home screen user interface 5014 in FIG. 5D), the device ceases to display the navigation user interface (e.g., in the state shown in FIG. 5C), and displays the application launching user interface (e.g., home screen user interface 5014) (e.g., as shown in FIG. 5D). The application launching user interface displays a plurality of application icons representing respective applications that are installed on the device. The plurality of application icons are arranged in a preset fashion (e.g., listed alphabetically, by category, or according to user configuration) on the application launching user interface, without regard to the relative recency by which the applications (or for at least some of them) corresponding to the application icons are last used (e.g., last displayed or interacted with by a user) on the device. Each application icon, when selected and activated by a user input (e.g., a tap input or double tap input), causes the device to open (e.g., display) the application corresponding to the application icon.

FIG. 5B followed by FIG. 5E illustrate that, when lift-off of contact 5004 were detected when the navigation user interface is in the configuration shown in FIG. 5B (e.g., lift-off location of contact 5004 is indicated by dashed lines in FIG. 5E), the device navigates to the application switching user interface, rather than to the application launching user interface (e.g., home screen user interface 5014).

As shown in FIG. 5E, the application switching user interface includes application representations corresponding to a plurality of recently used applications (e.g., a stack of open applications, or applications with retained states). The application representations (e.g., card 5010 corresponding to the maps application, card 5012 corresponding to the settings application, and card 5016 corresponding to a location-sharing application, etc.) are arranged in the application switching user interface (e.g., overlaid on background 5008) in an order that is based on the relative recency by which the applications were last used (e.g., displayed or interacted with by a user). For example, the most recently used application is placed at the top of the stack, and the least recently used application is placed at the bottom of the stack. As shown in FIG. 5E, in the application switching user interface, the application representations of the applications (e.g., cards 5010, 5012, and 5016) are displayed in an overlapped fashion, to indicate their relative order in the stack of recently used applications.

FIG. 5E represents a starting state of multiple scenarios in which a user interacts with the application switching user interface in different ways. A number of contacts 5018, 5024, and 5026 are shown on FIG. 5E, each of these contacts are independently detected at different times, and are not concurrently detected. Each of contacts 5018, 5024, and 5026 are part of different gestures that are separately detected in different scenarios.

Figure 5F:
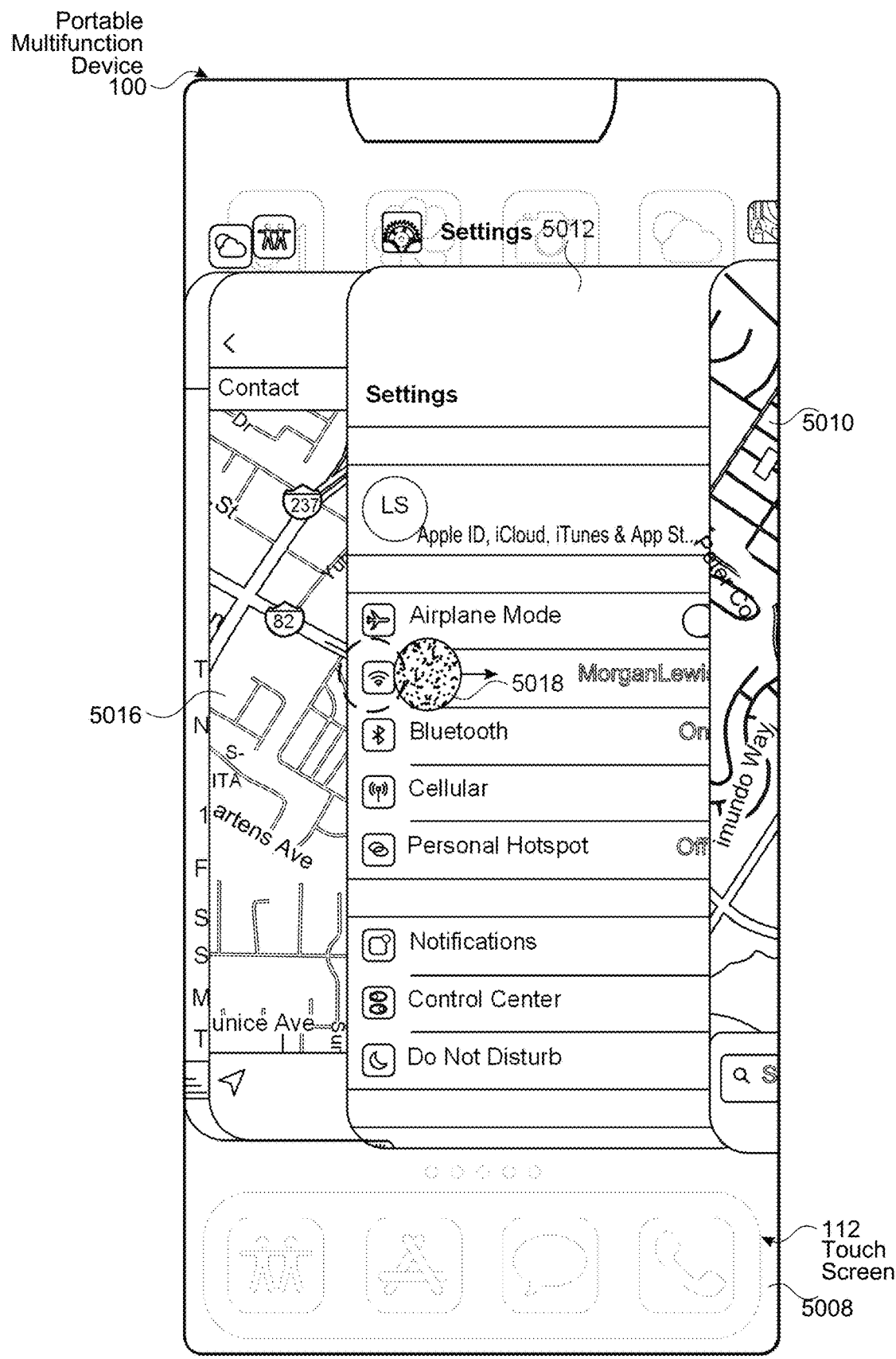
Figure 5G:
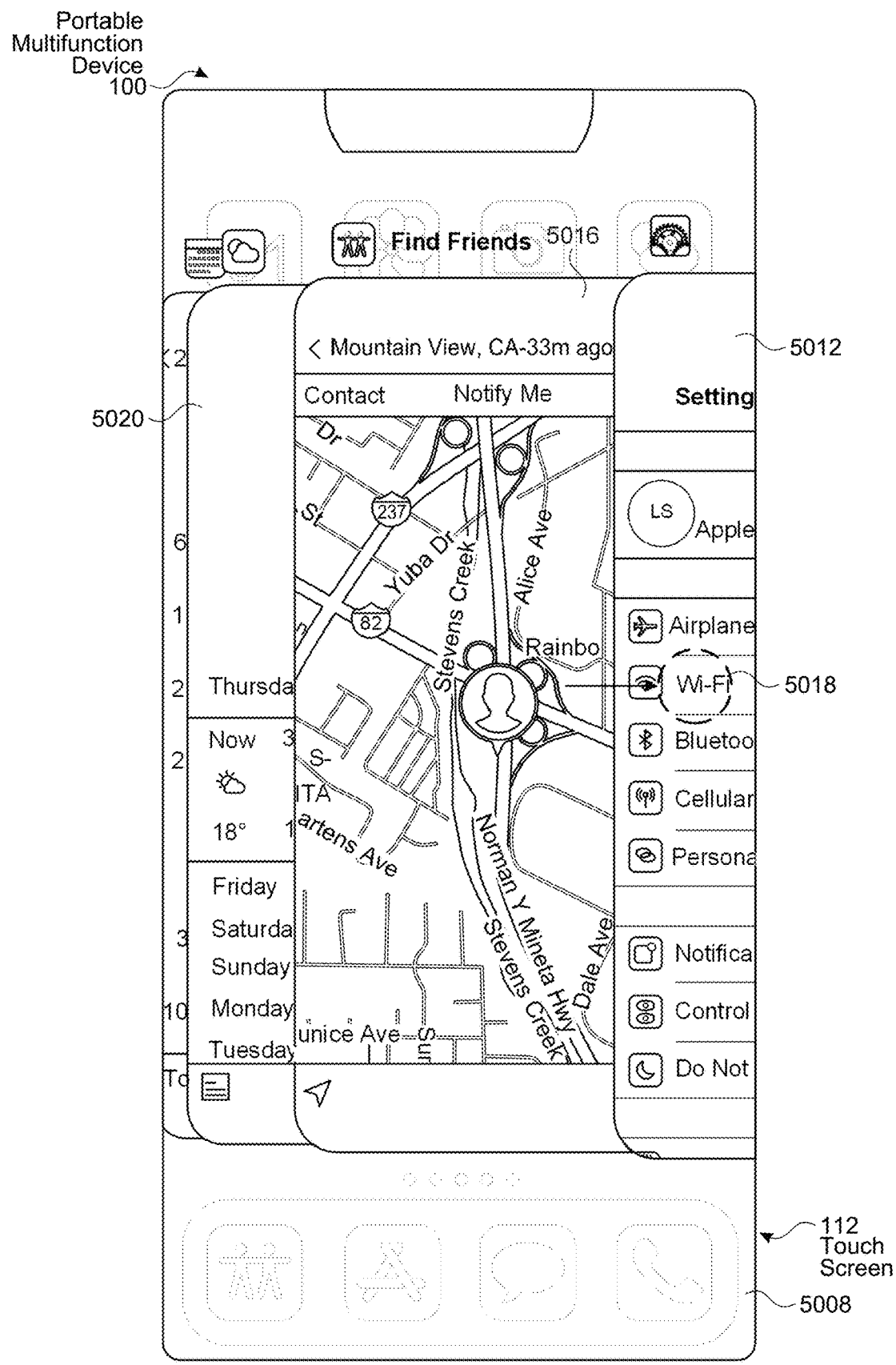

FIGS. 5E-5G illustrate that, a swipe gesture by a contact across the application switching user interface (e.g., started on an application representation of an application) causes the device to scroll through the application representations in the application switching user interface.

In FIGS. 5E-5G, the device detects contact 5018 on card 5012 (in FIG. 5E), detects horizontal movement of contact 5018 toward the right edge of the touch-screen (as shown by the horizontal arrows in FIGS. 5F and 5G), and detects lift-off of contact 5012 from the touch-screen after the movement (e.g., lift-off location of contact 5018 is indicated by dashed lines in FIG. 5G). In response to the horizontal swipe by contact 5018, the device moves cards 5010, 5012 and 5016 rightward, to reveal the card 5020 (e.g., an application representation for the weather application) underneath card 5016, as shown in FIGS. 5F and 5G.

FIG. 5E followed by FIGS. 5H-5K illustrate that, when an upward swipe gesture is detected on an application representation, the device closes the application corresponding to the application representation from which the upward swipe gesture is started.

As shown in FIG. 5E, contact 5018 is detected on card 5012 shown in the application switching user interface. In FIG. 5H, after contact 5018 remains substantially stationary for a threshold amount of time (e.g., a long press time threshold), the device enlarges card 5012 to indicate that card 5012 is selected. In some embodiments, the device enlarges card 5012 upon detecting touch-down of contact 5018 on card 5012, without requiring the contact to remain stationary for the threshold amount of time first.

Figure 5I:
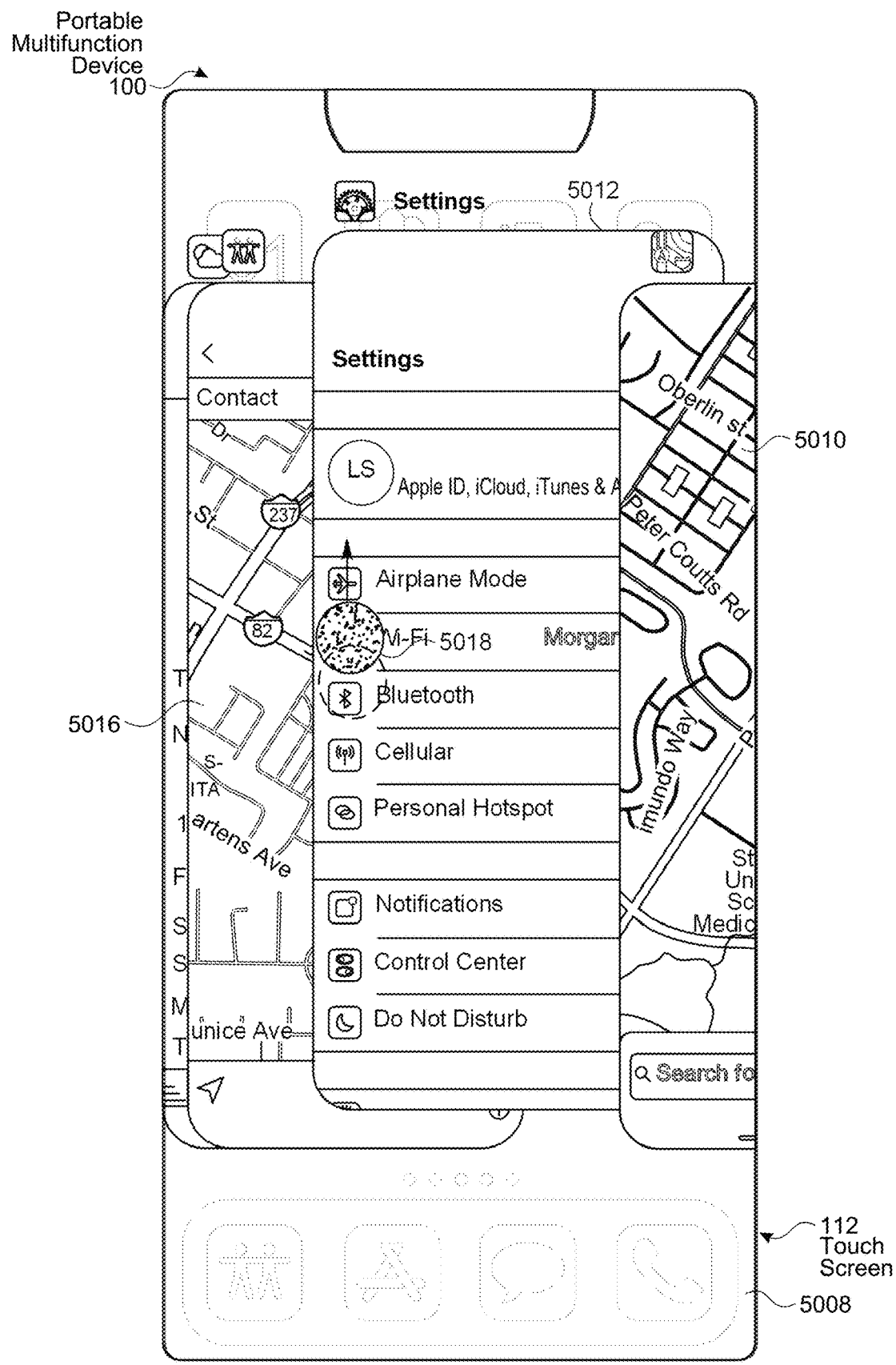
Figure 5J:
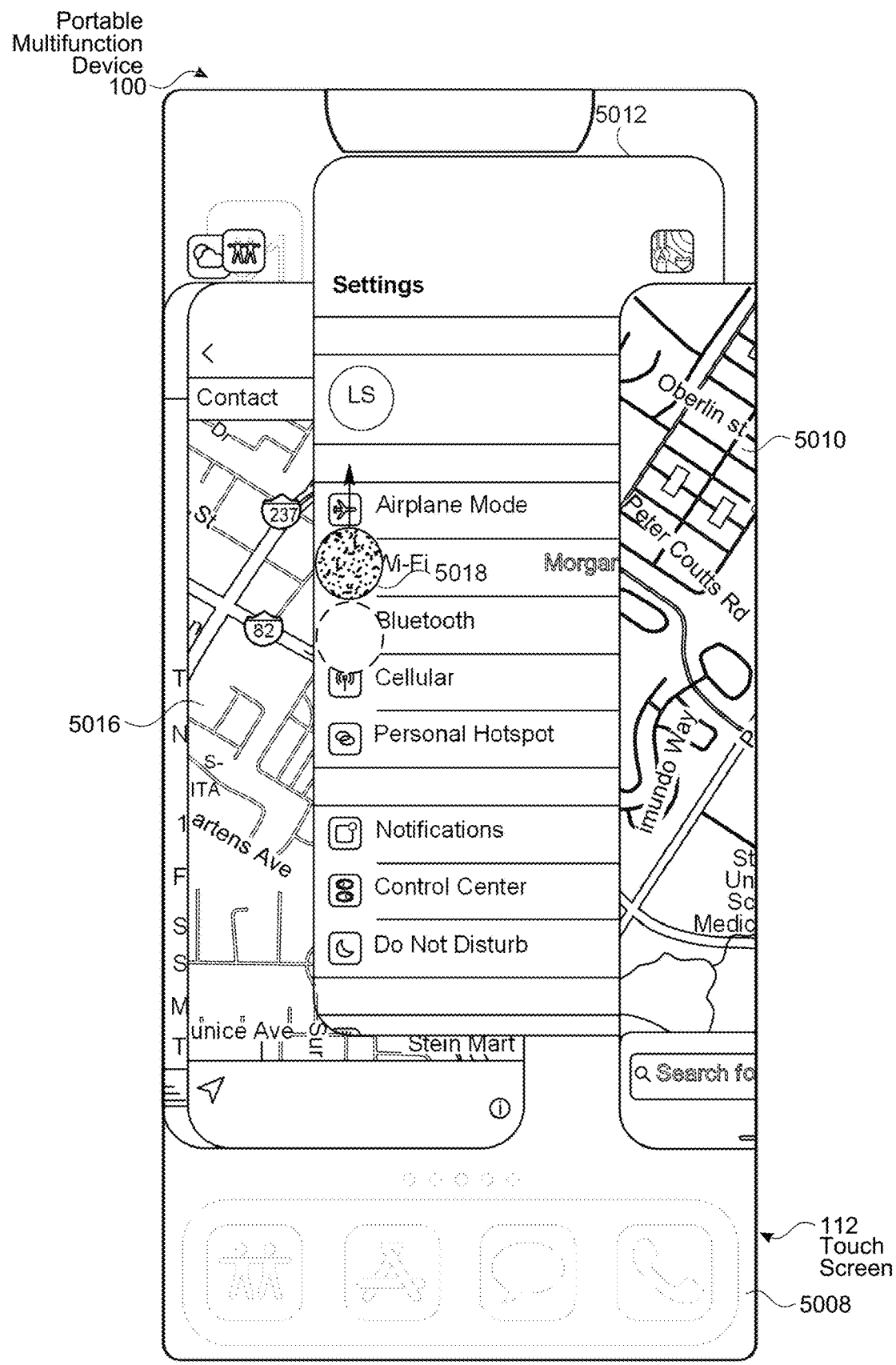

FIGS. 5I-5J continue from either the state shown in FIG. 5E (e.g., in accordance with embodiments that do not require the initial touch-hold of contact 5018) or the state shown in FIG. 5H (e.g., in accordance with embodiments that require the initial touch-hold of contact 5018), where upward movement of contact 5018 drags card 5012 upward across background 5008 in the application switching user interface. As shown in FIGS. 5I-5J, the size the card 5012 remain constant while card 5012 is dragged upward by contact 5018. In some embodiments, the size of card 5012 during the upward movement is the same as the size of other cards in the application-switching user interface (e.g., the size of card 5012 shrinks back to its original size before it is dragged out of the stack, if card 5012 had been enlarged due to the touch-hold of contact 5018 in FIG. 5H). In some embodiments, the size of card 5012 during the upward movement is the enlarged size of card 5012 (e.g., as shown in FIG. 5H).

Figure 5K:
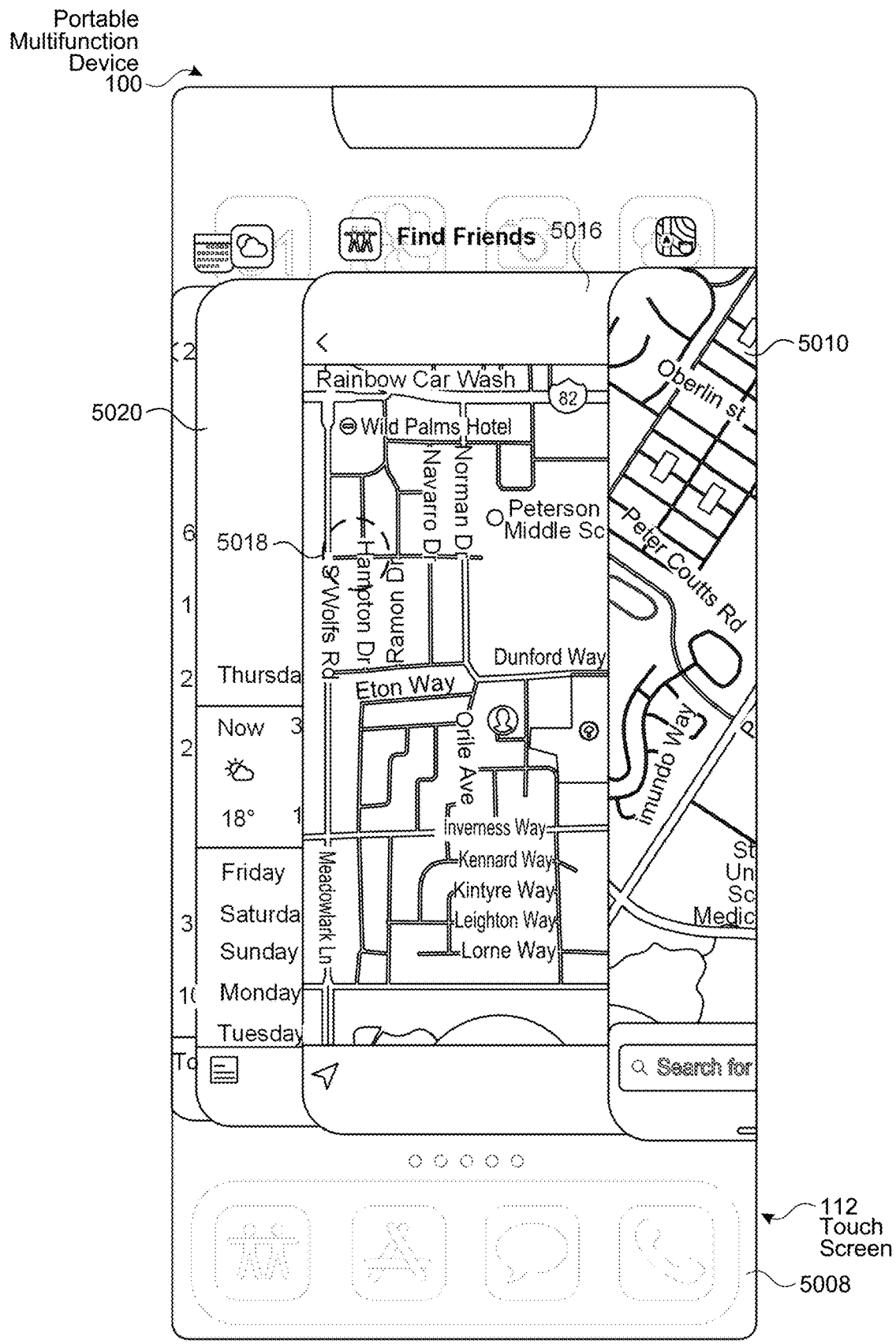

In FIG. 5J-5K, the device detects lift-off of contact 5018 at the end of the upward movement of contact 5018; and in response to the lift-off of contact 5018 (e.g., lift-off location of contact 5018 is indicated in FIG. 5K by dashed lines), in accordance with a determination that the contact has moved more than a threshold distance above its original location, the device ceases to display card 5012, and shifts cards 5010, 5016, and newly revealed card 5020 into the configuration shown in FIG. 5E. When card 5012 is removed from the application launching user interface, the device closes the application corresponding to card 5012 (e.g., the settings application). The device removes stored information regarding the last displayed state of the settings application in association with the application switching user interface, so that the next time that the application switching user interface is displayed, card 5012 will not be included among the stack of application representations of other recently used applications.

FIG. 5L follows either FIG. 5E or 5H. FIGS. 5E and 5L (or FIGS. 5H and 5L) illustrate that, if contact 5018 does not move by more than a threshold amount from its starting location during a threshold amount of time (e.g., remained substantially stationary) before it is lifted off the touch-screen, the device treats the detected input (e.g., a tap input by contact 5018 on card 5012) as a request to switch to the application corresponding to card 5012. As shown in FIG. 5L (e.g., lift-off location of contact 5018 is indicated by dashed lines), the device ceases to display application switching user interface shown in FIG. 5E (or FIG. 5H), and displays the last displayed user interface of the settings application (e.g., user interface 5022). In other words, in the process illustrated in the sequence of FIGS. 5A, 5B, 5E, and 5L, the user switched from displaying the maps application to the settings application using the application switching user interface.

FIG. 5M follows FIG. 5E. FIG. 5E followed by FIGS. 5M-5O illustrate that, when an upward swipe gesture is detected on another application representation, the device closes the application corresponding to that application representation from which the upward swipe gesture is started.

As shown in FIG. 5E, contact 5024 is detected on card 5010 shown in the application switching user interface. In FIG. 5M, after contact 5024 remains substantially stationary for a threshold amount of time (e.g., a long press time threshold), the device enlarges card 5010 to indicate that card 5010 is selected. In some embodiments, the device enlarges card 5010 upon detecting touch-down of contact 5024 on card 5010, without requiring the contact to remain stationary for the threshold amount of time first.

Figure 5N:
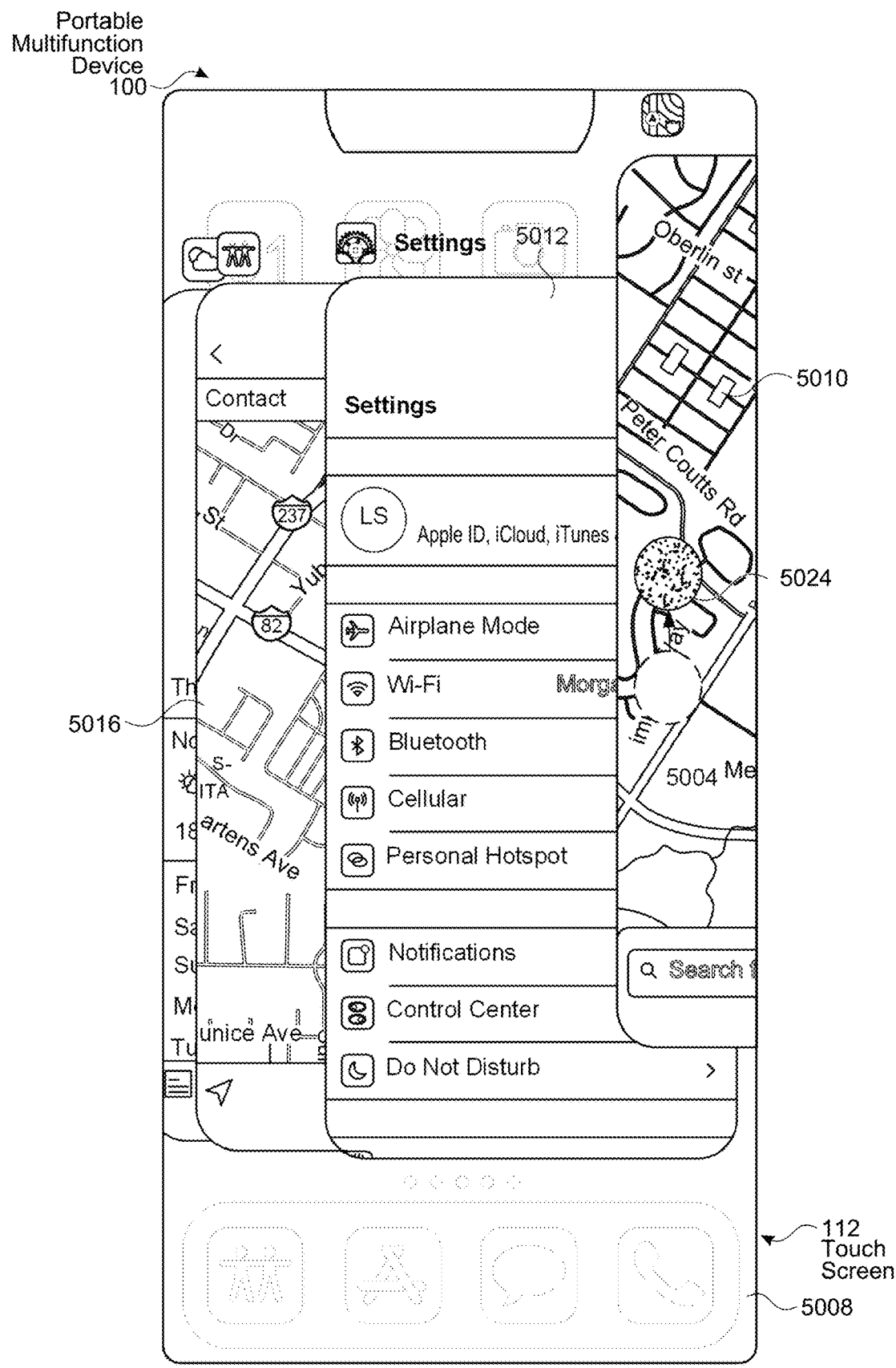

FIG. 5N continues from either the state shown in FIG. 5E (e.g., in accordance with embodiments that do not require the initial touch-hold of contact 5024) or the state shown in FIG. 5M (e.g., in accordance with embodiments that require the initial touch-hold of contact 5024), where upward movement of contact 5024 drags card 5010 upward across background 5008 in the application switching user interface. As shown in FIG. 5N, the size the card 5010 remains constant while card 5010 is dragged upward by contact 5024. In some embodiments, the size of card 5010 during the upward movement is the same as the size of other cards in the application-switching user interface (e.g., the size of card 5010 shrinks back to its original size before it is dragged out of the stack, if card 5010 has been enlarged due to the touch-hold of contact 5024 in FIG. 5M). In some embodiments, the size of card 5010 during the upward movement is the enlarged size of card 5010 (e.g., as shown in FIG. 5M).

Figure 5O:
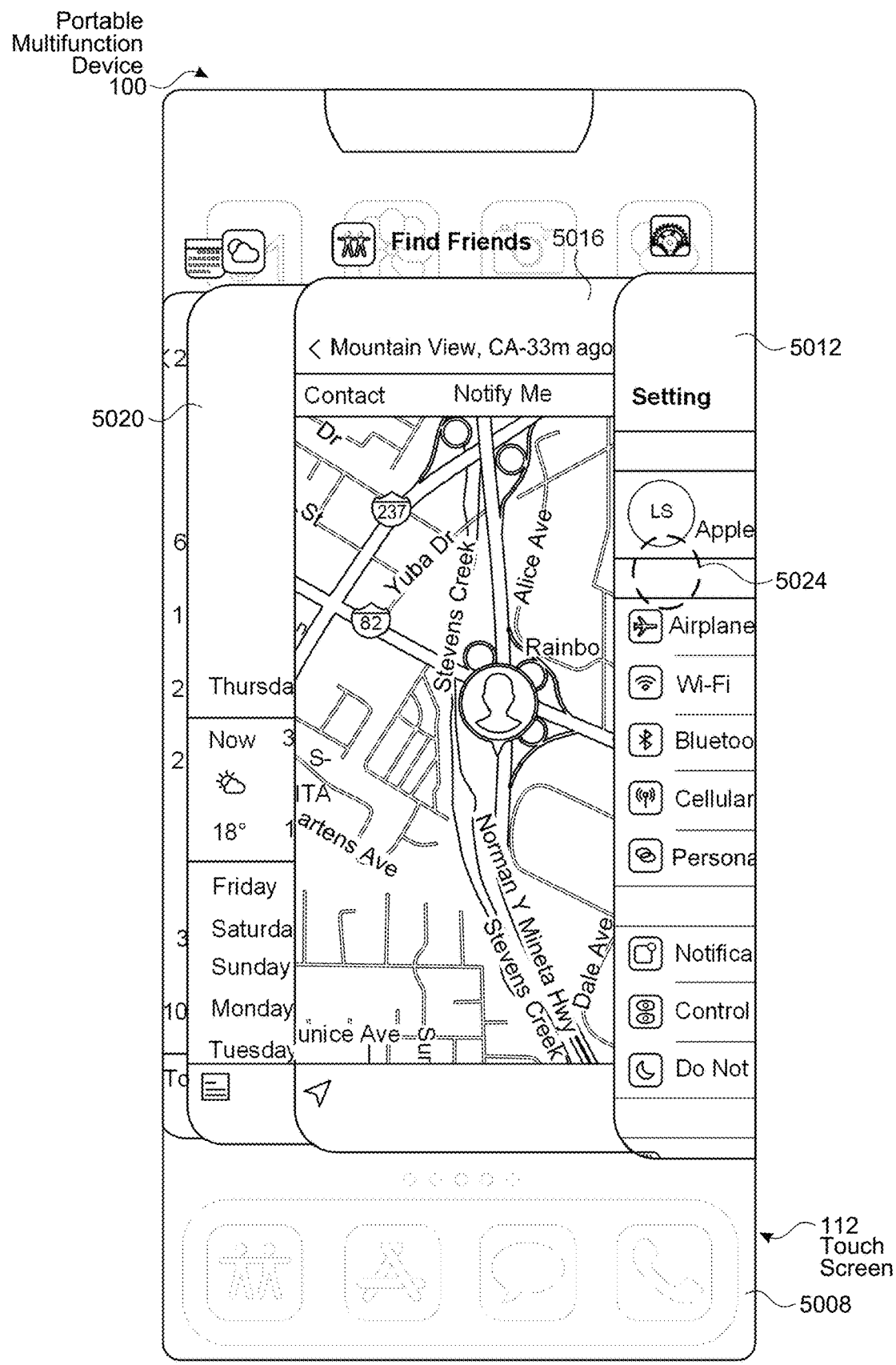

In FIGS. 5N-5O, the device detects lift-off of contact 5024 at the end of the upward movement of contact 5024; and in response to the lift-off of contact 5024 (e.g., lift-off location of contact 5024 is indicated in FIG. 5O by dashed lines), the device ceases to display card 5010, and shifts cards 5012, 5016, and newly revealed card 5020 into the configuration shown in FIG. 5E. When card 5010 is removed from the application launching user interface, the device closes the application corresponding to card 5010 (e.g., the maps application). The device removes stored information regarding the last displayed state of the maps application in association with the application switching user interface, so that the next time that the application switching user interface is displayed, card 5010 will not be included among the stack of application representations of other recently used applications.

FIG. 5P follows FIG. 5N. In FIGS. 5N and 5P, contact 5024 has dragged card 5010 upward away from the stack of cards in the application switching user interface (e.g., as shown in FIG. 5N), and then reversed movement direction (e.g., moved downward toward the original location of contact 5024). As shown in FIG. 5P, after lift-off of contact 5024 is detected (e.g., lift-off location of contact 5024 is shown in dashed lines in FIG. 5P), the device moves card 5010 back into the stack of cards in the application switching user interface, and the configuration of the application switching user interface in FIG. 5E is restored.

FIG. 5Q follows FIG. 5E. FIGS. 5Q-5T following FIG. 5E illustrate a process in which an upward swipe gesture detected in a portion of the application switching user interface outside of the application representation of any applications (e.g., the portions of the background 5008 (e.g., the bottom portion, or the top portion of the background 5008) that is not blocked by any card), and that is not within a bottom edge portion of the touch screen, causes the device to navigate from the application switching user interface to the application launching user interface (e.g., home screen user interface 5014).

As shown in FIGS. 5E and 5Q, contact 5026 is initially detected below the stack of cards in the application switching user interface (e.g., the initial location of contact 5026 is indicated by dashed lines in FIG. 5Q) and then moves upward on the touch-screen. In response to upward movement of contact 5026, the device changes the display configuration of the application representations in the application switching user interface. For example, the stacked cards 5010, 5012, and 5016 move apart from one another (and are optionally resized), and cease to overlap with one another, as shown in FIG. 5Q, in response to upward movement of contact 5026.

Figure 5R:
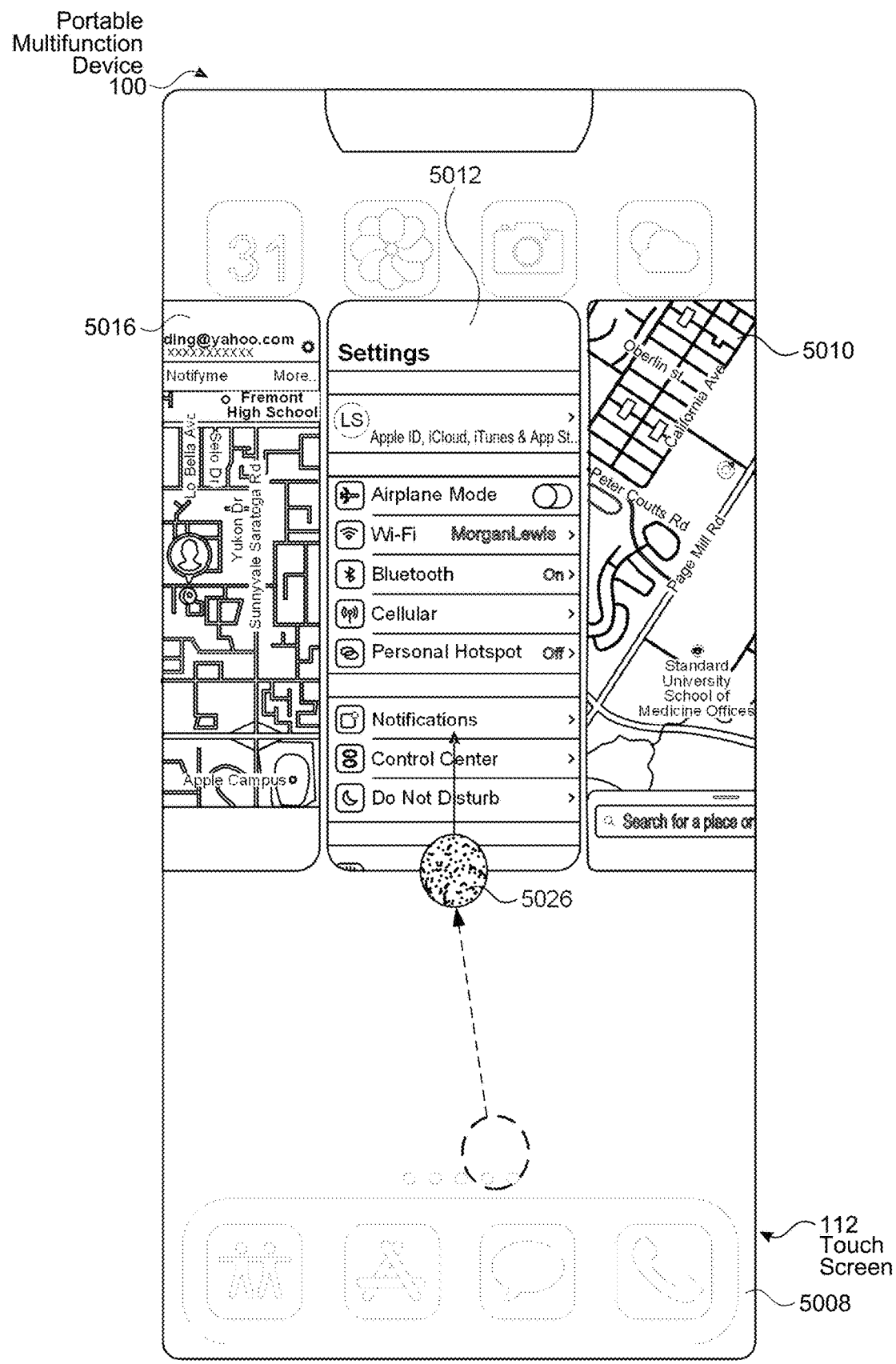

FIGS. 5Q-5R illustrate that, as contact 5026 continues to move upward, cards 5010, 5012, and 5016 move upward in unison with contact 5026. As cards 5010, 5012, and 5016 move upward with contact 5026, the sizes of cards 5010, 5012, and 5016 are reduced dynamically in accordance with the upward movement of contact 5026.

In some embodiments, while movement of contact 5026 still meets the criteria for navigating back to the application switching user interface (e.g., when the movement parameter of the movement of contact 5026 is below a threshold value (e.g., movement distance is below a threshold distance, or movement speed is below a threshold speed before lift-off)) (e.g., when the criteria for navigating to the application launching user interface are not met), three cards 5010, 5012, and 5016 remain displayed side by side under contact 5026, as shown in FIGS. 5Q-5R.

Figure 5S:
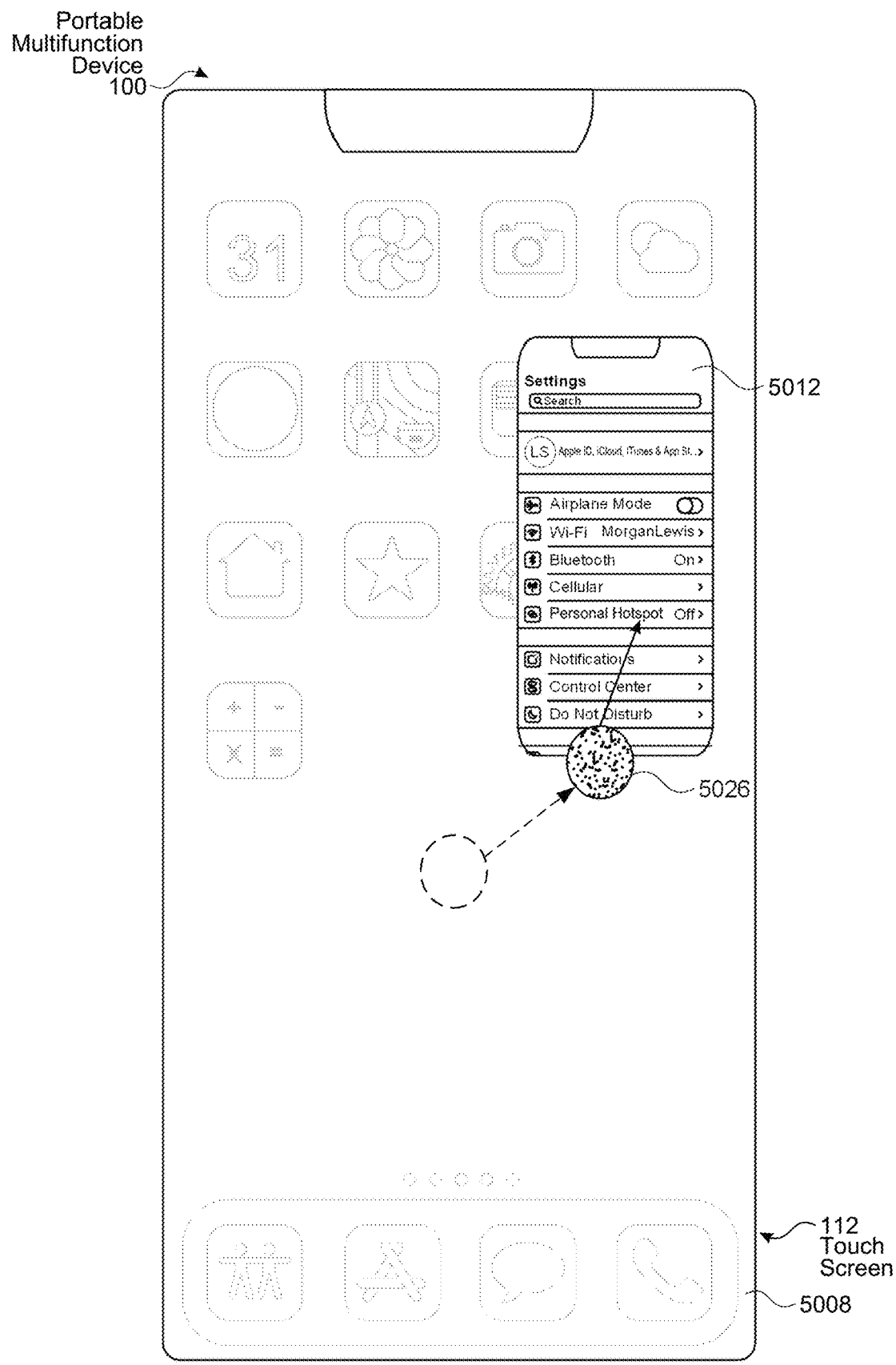

In FIG. 5S, when movement of contact 5026 meets the criteria for navigating to the application launching user interface (e.g., home screen user interface 5014), the device ceases to display cards 5016 and 5010, and only displays card 5012 which is the center card that is shown in the navigation user interface, to indicate that the device will display the application launching user interface if lift-off of contact 5026 were detected at this moment.

Figure 5T:
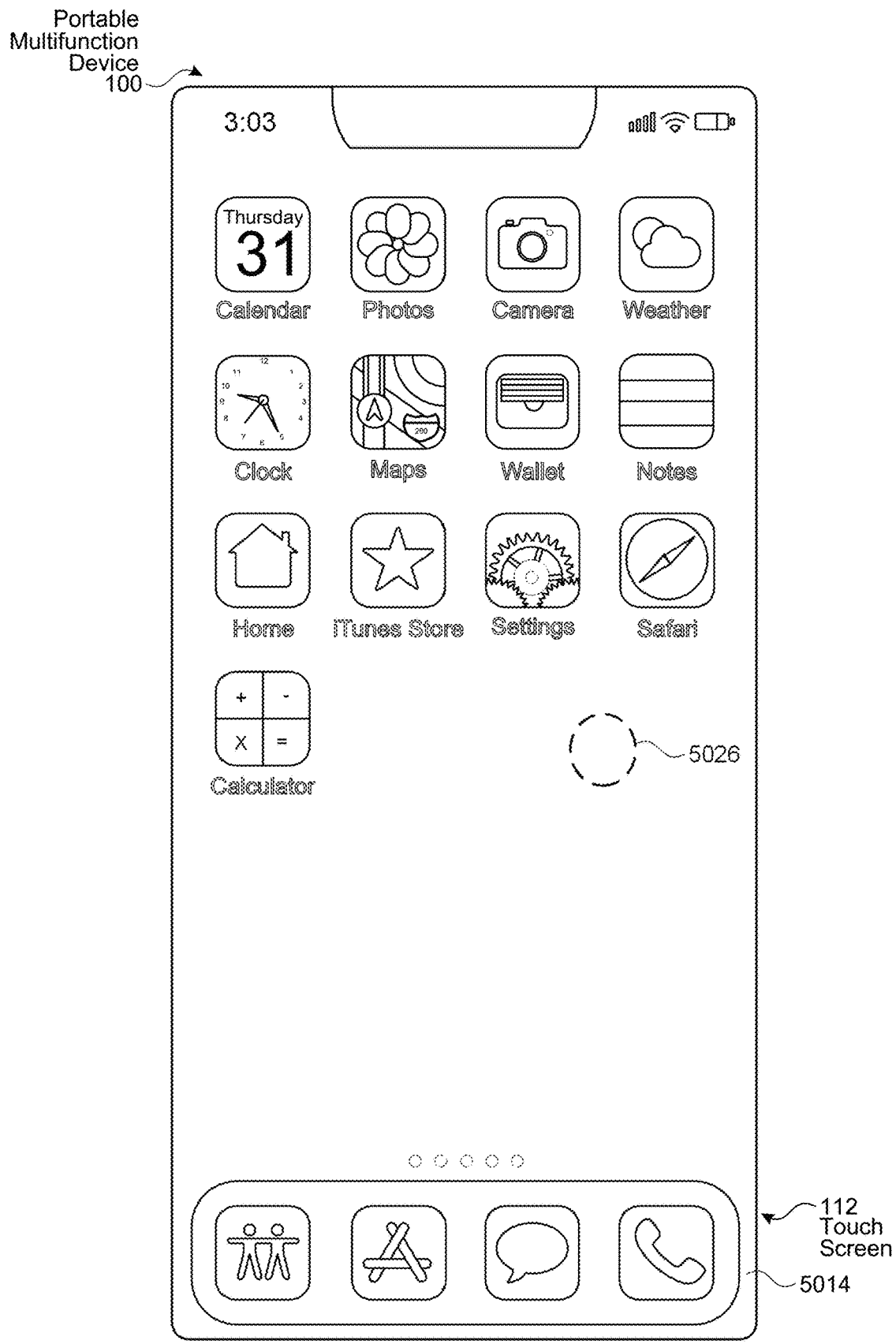

In FIGS. 5S-5T, lift-off of contact 5026 is detected while the criteria for navigating to the application launching user interface are met (e.g., lift-off location of contact 5026 is shown by dashed lines in FIG. 5T). In response to detecting the lift-off of contact 5026 and in accordance with a determination that the criteria for navigating to the application launching user interface are met, the device ceases to display the navigation user interface (e.g., as shown in FIG. 5S) and displays the application launching user interface (e.g., home screen user interface 5014, as shown in FIG. 5T).

In some embodiments, home affordance 5006 is not displayed in the application switching user interface or the navigation user interface, but an upward edge swipe gesture (e.g., that started from a bottom edge region of the touch-screen) that is detected while the application switching user interface is displayed also causes the device to navigate to the application launching user interface and the animation of the navigation user interface shown in FIGS. 5Q-5S is optionally displayed as well. This is in contrast to the navigation scenario shown in FIGS. 5A-5D. For example, the navigation user interface in FIGS. 5Q and 5R does not include a representation of the application switching user interface (e.g., there is no card that represents the application switching user interface shown in FIG. 5E, in the navigation user interface shown in FIGS. 5Q and 5R), but instead includes cards representing recently open applications that were not displayed at the time when the contact (e.g., contact 5026) was initially detected in the bottom edge region of the touch screen. Thus, in some embodiments, in response to an upward edge swipe gesture: in accordance with a determination that a respective user interface that was currently displayed at the start of the gesture is an application user interface, the device displays a navigation user interface that includes a representation of the respective user interface; and in accordance with a determination that the respective user interface that was currently displayed at the start of the gesture is a system level user interface (e.g., an application switching user interface or an application launching user interface), the device displays a navigation user interface that does not include a representation of the respective user interface.

In FIG. 5E followed by FIGS. 5Q-5T, the visual feedback is continuous and fluid in accordance with the upward and side-way movement of contact 5026. The movement of contact 5026 is evaluated continuously against the criteria for navigating to different user interfaces (e.g., the application switching user interface, or the application launching user interface), and corresponding visual feedback is provided to indicate the current target state of the user interface navigation (e.g., a reversal of the changes as shown in FIGS. 5S-5Q will be shown if the movement of contact 5026 is reversed before lift-off of contact 5026).

FIG. 5U follows FIG. 5E or 5H. The sequence of FIGS. 5U-5X following FIG. 5E and the sequence of FIGS. 5U-5V and 5Z illustrate that, a downward swipe gesture that started from a location on an application representation of a respective application in the application switching user interface causes the device to display the respective application in an enhanced-reachability mode or a default full-screen mode, depending on whether the criteria for navigating to the application in enhanced-reachability mode are met, or whether the criteria for navigating to the application in the default full-screen mode are met.

Figure 5V:
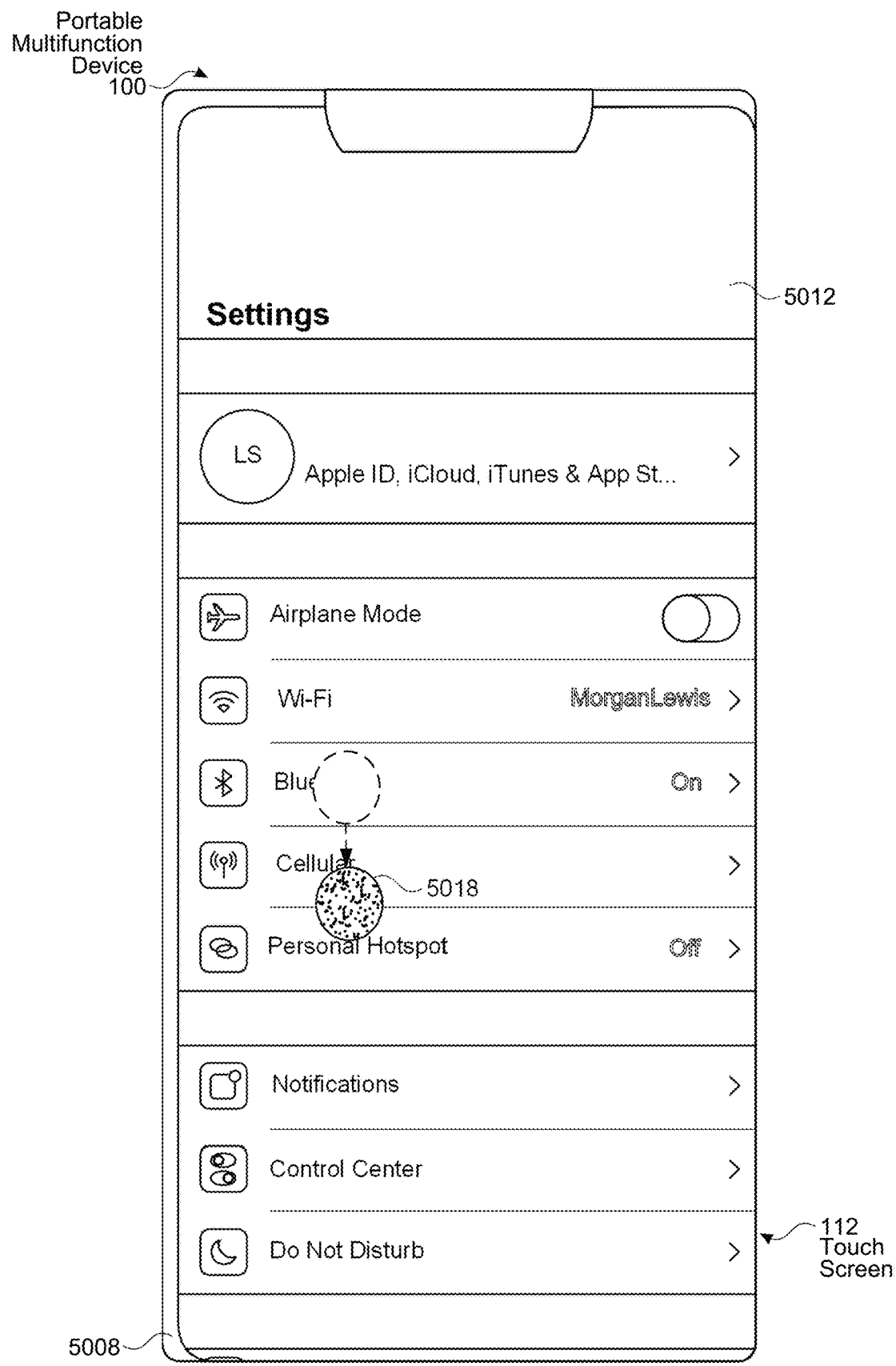

First, the sequence of FIG. 5E (or FIG. 5H) followed by FIGS. 5U and 5V illustrate that, after contact 5018 is detected on card 5012 in the application switching user interface (e.g., in the configuration as shown in FIG. 5E (or FIG. 5H)), downward movement of contact 5018 causes cards 5010, 5012, and 5016 to expand in size in accordance with the downward movement of contact 5018. As card 5012 continues to grow in size with the downward movement of contact 5018, cards 5010 and 5016 are pushed out of view (e.g., as shown in FIG. 5V). In FIG. 5V, when only card 5012 is displayed over background 5008, the criteria for navigating to the application corresponding to card 5012 in a default full-screen mode are met (e.g., a distance of the downward movement of contact 5018 is greater than a first threshold distance and less than a second threshold distance, or the movement speed of the downward movement of contact 5018 is less than a threshold speed). If lift-off of contact 5018 occurred at the moment illustrated in FIG. 5V, the device will display the user interface 5022 (e.g., as shown in FIG. 5Z) for the settings application in the default full-screen mode.

Figure 5W:
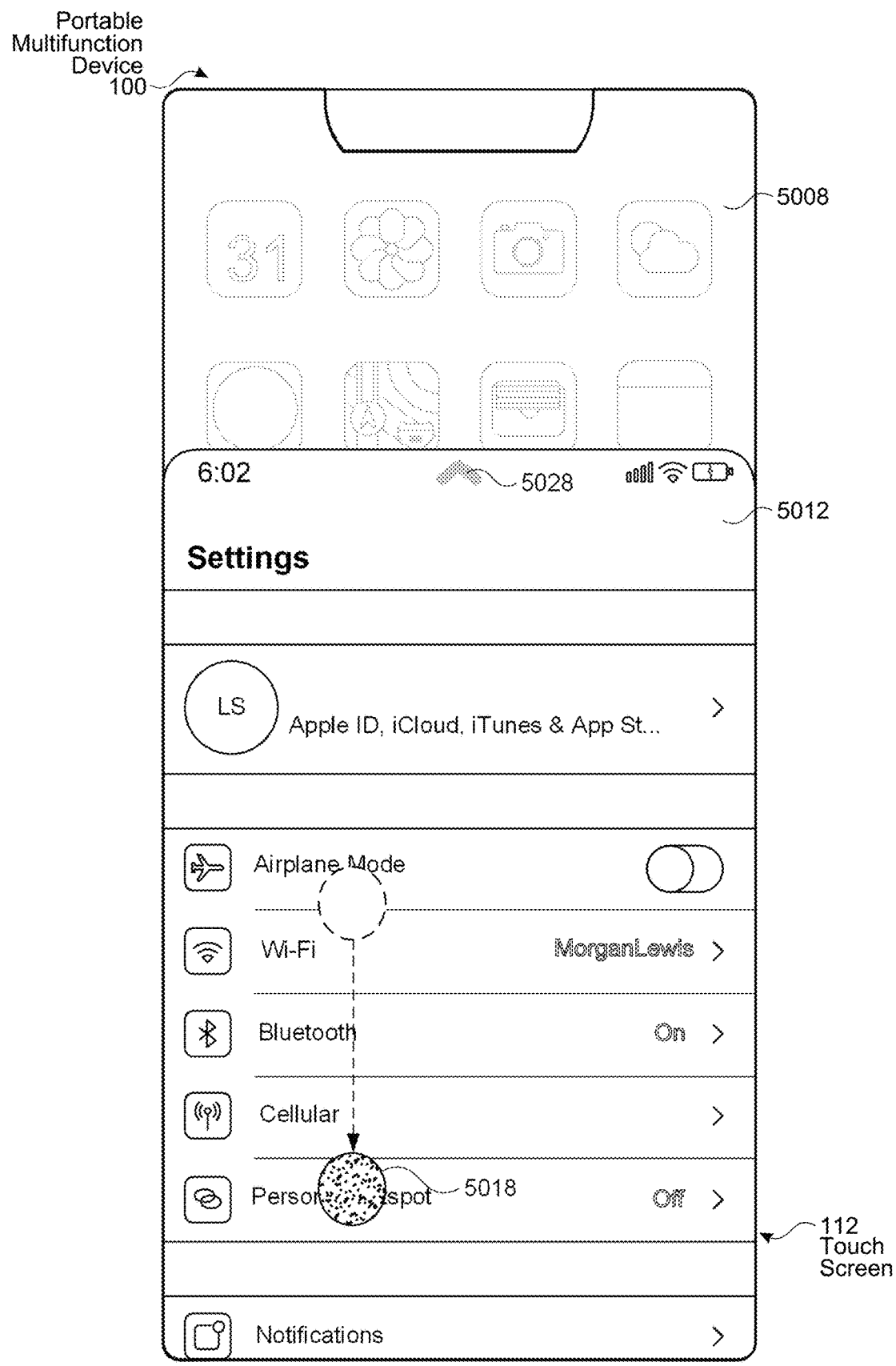

If lift-off of contact 5018 did not occur at the moment illustrated in FIG. 5V, and downward movement of contact 5018 continues (e.g., as shown in FIG. 5W), card 5012 displayed in full-width is shifted downward with contact 5018, revealing a portion of background 5008 above card 5012 on the touch-screen. In some embodiments, an indication of a pull-up tab (e.g., chevron 5028) is gradually revealed to indicate that the criteria for displaying the application in an enhanced-reachability mode will be met soon.

Figure 5X:
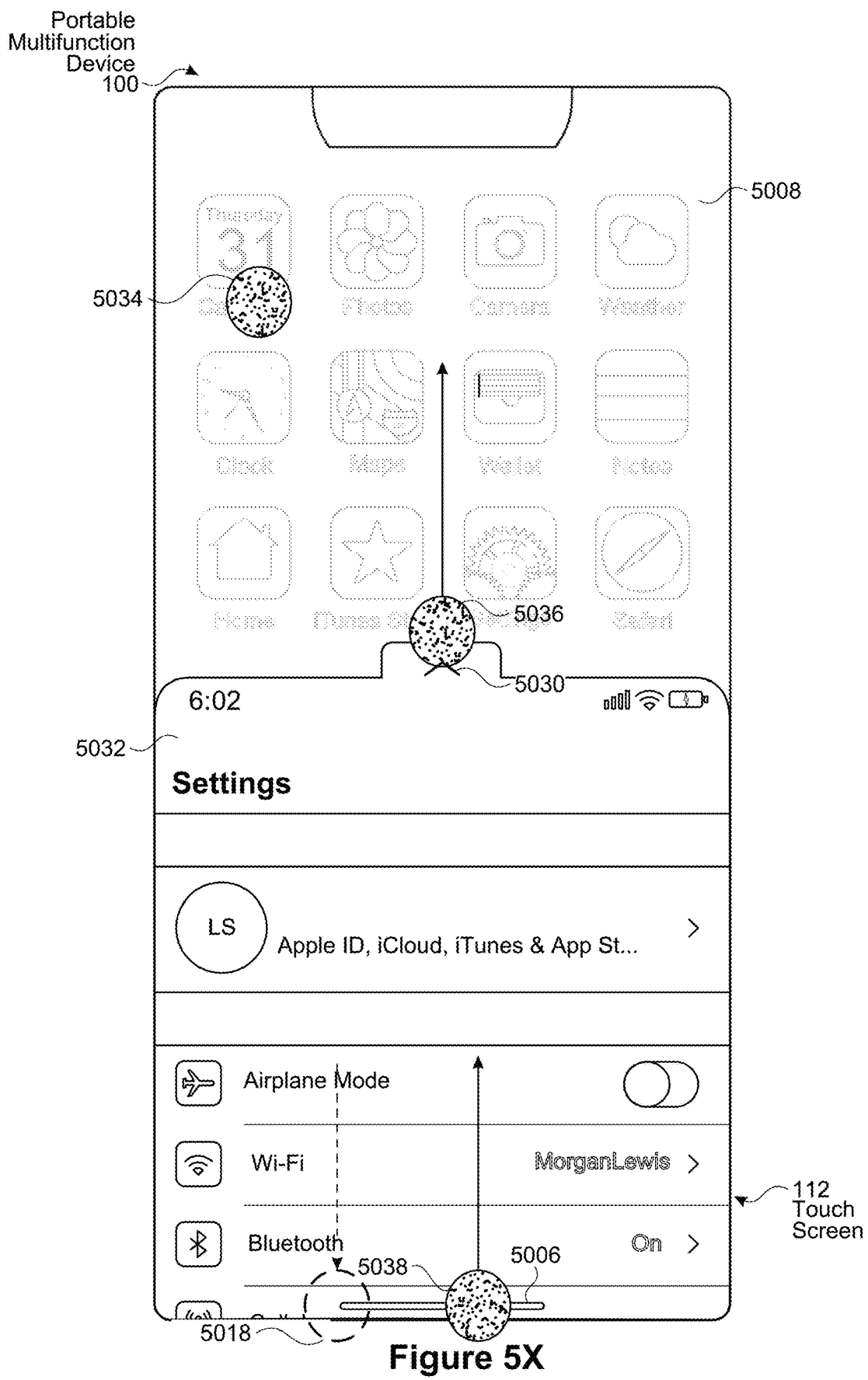

FIGS. 5W-5X illustrate that, the device displays the user interface (e.g., user interface 5032) for the settings application in the enhanced-reachability mode (e.g., user interface 5032 shows only an upper portion of the user interface 5022, as if the user interface 5022 is shifted half-way down on the touch-screen), in response to detecting the lift-off of contact 5018 after the contact has cross the threshold position on the touch-screen (e.g., reached the bottom edge region of the touch-screen, as shown by the lift-off position of contact 5018 indicated by dashed lines in FIG. 5X). In some embodiments, a pull-up tab (e.g., tab 5030 with a chevron-shaped indicator) is displayed adjacent to the top of user interface 5032. Displaying the user interface of an application in an enhanced-reachability mode (e.g., as shown in FIG. 5X) allows the user to easily access the top portion of the user interface (e.g., using a thumb) while holding the device by hand.

Figure 5Y:
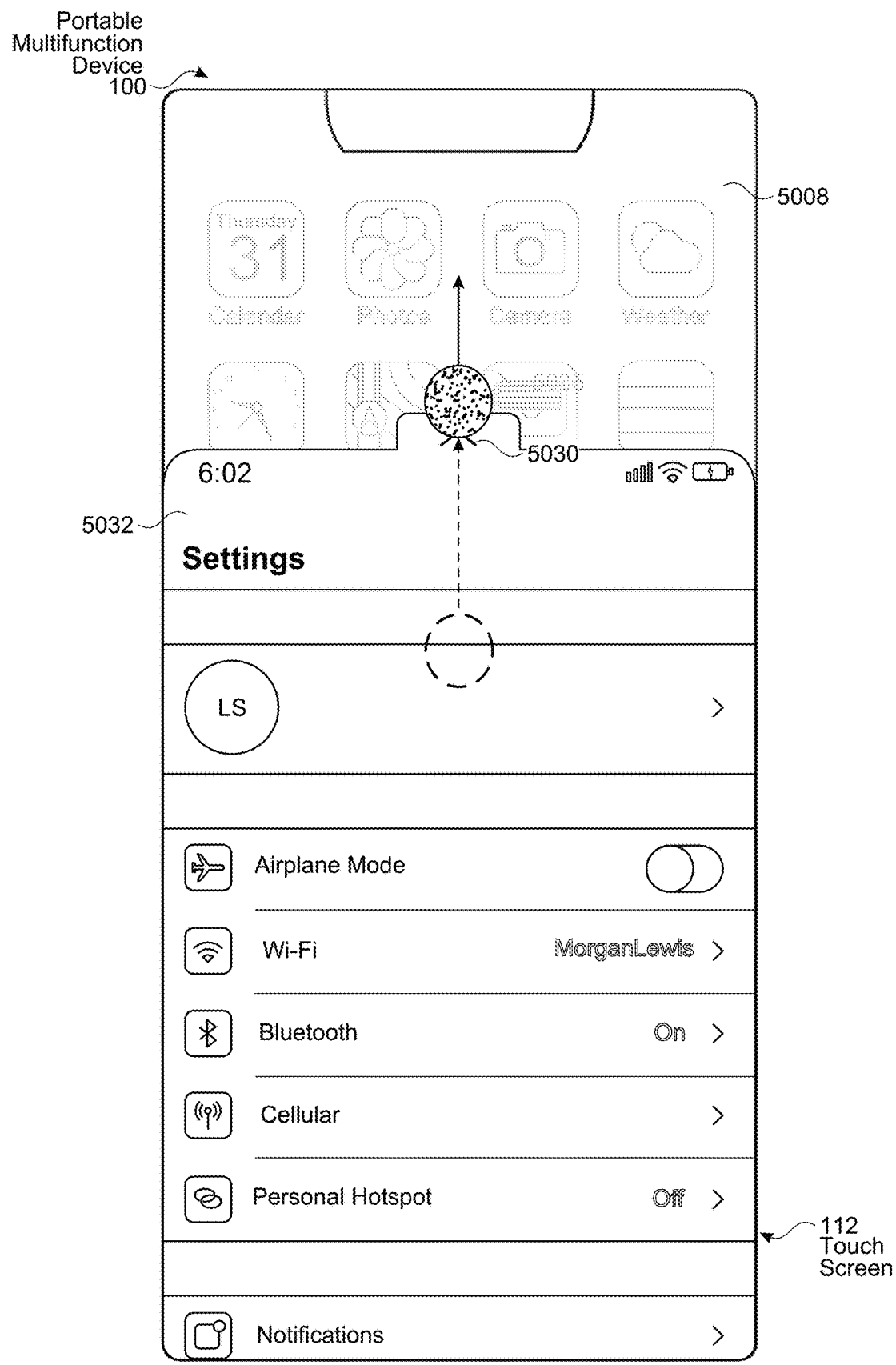
Figure 6A:
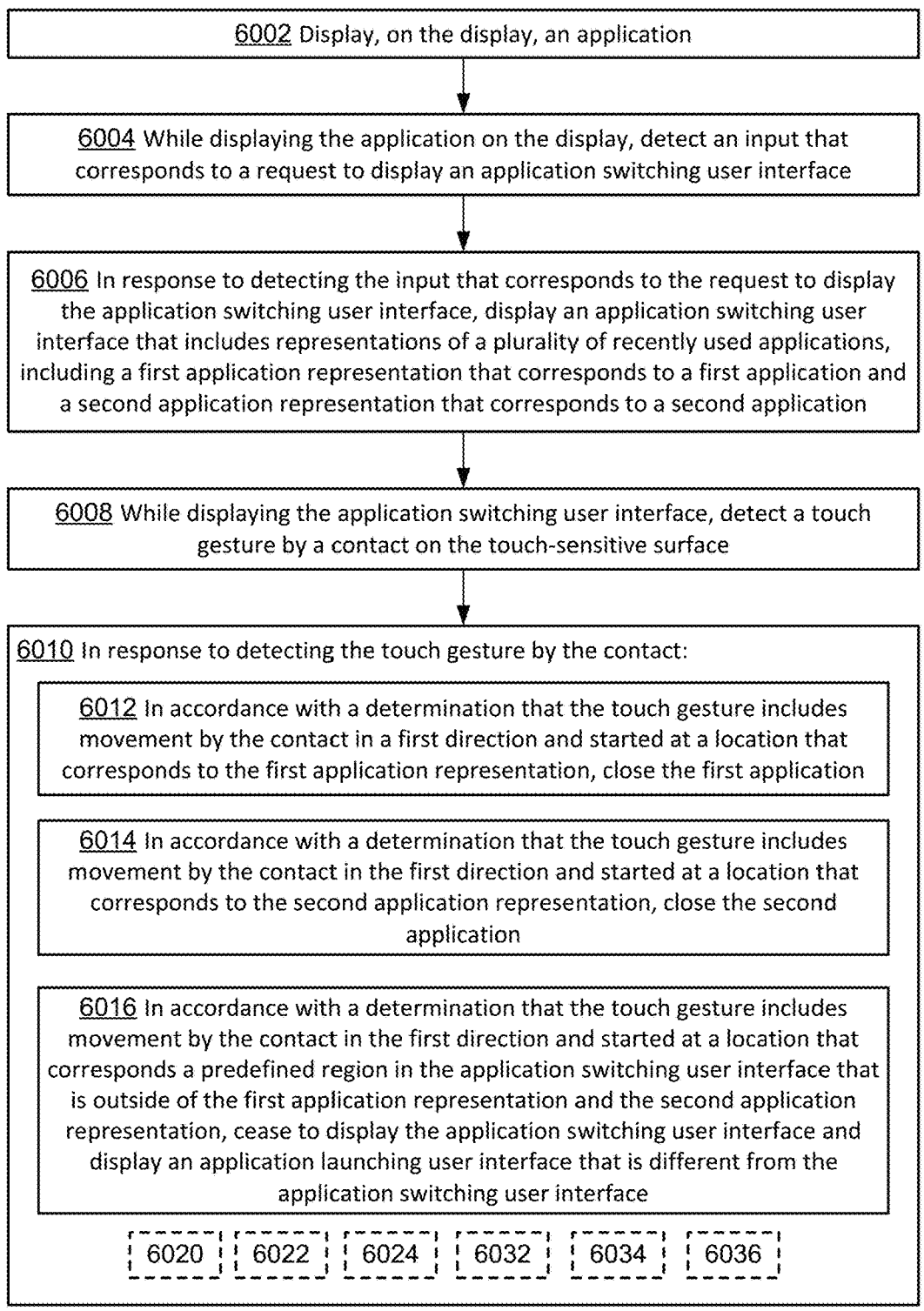

FIGS. 5X-5Z illustrate a process to return to displaying the user interface of the application in the default full-screen mode (e.g., user interface 5022 in FIG. 5Z) based on input detected while the user interface of the application in the enhanced-reachability mode (e.g., user interface 5032 in FIG. 5X) is displayed.

In FIG. 5X, multiple contacts (e.g., contacts 5034, 5036, and 5038) are shown on the touch-screen. These contacts are not concurrently detected contacts. They represent contacts separately detected in different example scenarios, which result in the display of the user interface of the settings application in the default full-screen mode.

In FIGS. 5X-5Z, the device detects contact 5036 on tab 5030 and detects movement of contact 5036 pulling tab 5030 upward and dragging the user interface of the settings application upward. In FIG. 5Z, once contact 5036 has moved past a threshold position or lifted off with greater than a threshold speed (e.g., in a quick flick gesture) (e.g., lift-off position of contact 5036 is indicated by dashed lines in FIG. 5Z), the device displays user interface 5022 of the settings application in the default full-screen mode.

In FIG. 5X followed by FIG. 5Z, the device detects a tap input by contact 5034 in an area of background 5008 above the user interface 5032 of the settings application displayed in the enhanced-reachability mode (e.g., lift-off position of contact 5034 is indicated in FIG. 5Z by dashed lines). In response to detecting the tap input by contact 5034, the device ceases to display the settings application in the enhanced-reachability mode, and displays the settings application in the default full-screen mode (as shown in FIG. 5Z).

In FIG. 5X followed by 5Z, the device detects an upward edge swipe input (e.g., upward movement of contact 5038) that started from the bottom edge region of the touch screen (e.g., as indicated by the location of home affordance 5006). In accordance with a determination that the upward edge swipe input meets predefined criteria (e.g., with a lift-off speed greater than a threshold speed, or a movement distance above a threshold distance away from the bottom edge of the touch-screen), the device ceases to display the settings application in the enhanced-reachability mode (e.g., as shown in FIG. 5X), and displays the settings application in the default full-screen mode (e.g., as shown in FIG. 5Z).

FIGS. 6A-6D are flow diagrams illustrating a method of interacting with an application switching user interface, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 6000 is performed by an electronic device (e.g., portable multifunction device 100, FIG. 1A) and/or one or more components of the electronic device (e.g., I/O subsystem 106, operating system 126, etc.). In some embodiments, method 6000 is governed by instructions that are stored in a non-transitory computer-readable storage medium and that are executed by one or more processors of a device, such as the one or more processors 122 of device 100 (FIG. 1A). For ease of explanation, the following describes method 6000 as performed by device 100. In some embodiments, with reference to FIG. 1A, the operations of method 6000 are performed by or use, at least in part, operating system 126, communication module 128, and/or graphics module 132, as well as a touch-sensitive display (e.g., touch screen 112). Some operations in method 6000 are, optionally, combined and/or the order of some operations is, optionally, changed.

As described below, method 6000 (and associated interfaces) provides an intuitive way to perform operations in an application switching user interface, such as closing applications, navigating to an application launching user interface (e.g., a home screen), or navigating to different applications. The method reduces the number, extent, and/or nature of the inputs from a user when performing operations in an application switching user interface, thereby creating a more efficient human-machine interface. For battery-operated electronic devices, enabling a user to perform operations in an application switching user interface faster and more efficiently conserves power and increases the time between battery charges.

In method 6000, the device displays (6002), on the display, an application (e.g., device displaying a user interface 5002 of a maps application as show in FIG. 5A). While displaying the application on the display (e.g., as opposed to a system level user interface, such as a home screen user interface or application launching user interface, or control panel user interface), the device detects (6004) an input that corresponds to a request to display an application switching user interface (e.g., an upward swipe by contact 5004 that started from the bottom edge of the touch-screen, as shown in FIGS. 5A-5B). In response to detecting the input that corresponds to the request to display the application switching user interface, the device displays (6006) an application switching user interface (e.g., a user interface listing a plurality of recently used applications, as shown in FIG. 5E, following FIG. 5B) that includes representations of a plurality of recently used applications (e.g., the most recently used applications on the device such as a predetermined number (e.g., 2, 3, 4, 5, 6) of the applications that were most recently displayed or used on the device), including a first application representation that corresponds to a first application (e.g., card 5010 corresponding to the maps application) and a second application representation that corresponds to a second application (e.g., card 5012 corresponding to the settings application). While displaying the application switching user interface, the device detects (6008) a touch gesture by a contact (e.g., contact 5018, 5024, or 5026 in FIG. 5E following FIG. 5B) on the touch-sensitive surface (e.g., a touch and drag gesture by the contact, including initial touch-down of the contact and subsequent movement of the contact, and optionally, lift-off of the contact). In response to detecting the touch gesture (6010), the device performs one or more operations in accordance with various determinations (e.g., operations 6012, 6014, 6016, 6020, 6022, 6024, 6032, 6034, and 6036). In accordance with a determination that the touch gesture includes movement by the contact (e.g., contact 5018) in a first direction (e.g., a direction on the touch sensitive surface that corresponds to a vertically upward direction across the display) and started at a location that corresponds to the first application representation (e.g., the settings application), the device closes (6012) the first application (e.g., without regard to a duration of the contact on the touch-sensitive surface prior to detecting movement of the contact in the first direction). This is illustrated in FIGS. 5I-5K following FIG. 5E or 5H, where the settings application is closed (e.g., removed from the list of recently open applications in association with the application switching user interface) after an upward swipe gesture by contact 5018 is detected on card 5012. Other application representation applications and the application switching user interface remain displayed after the upward swipe gesture by contact 5018 is terminated. In accordance with a determination that the touch gesture includes movement by the contact (e.g., contact 5024) in the first direction and started at a location that corresponds to the second application representation (e.g., the maps application), the device closes (6014) the second application (e.g., without regard to a duration of the contact on the touch-sensitive surface prior to detecting movement of the contact in the first direction) This is illustrated in FIGS. 5N-5O following FIG. 5E or 5M, where the maps application is closed (e.g., removed from the list of recently open applications in association with the application switching user interface) after an upward swipe gesture by contact 5024 is detected on card 5010. Other application representation applications and the application switching user interface remain displayed after the upward swipe gesture by contact 5018 is terminated. In accordance with a determination that the touch gesture includes movement by the contact (e.g., contact 5026) in the first direction and started at a location that corresponds a predefined region in the application switching user interface that is outside of (e.g., below) the first application representation and the second application representation (e.g., a location that is outside of any application representation), the device ceases (6016) to display the application switching user interface and displays an application launching user interface (e.g., home screen user interface 5014, as shown in FIG. 5T) that is different from the application switching user interface (e.g., a home screen user interface). This is illustrated in FIGS. 5Q-5T following 5E, where the device displays the home screen user interface 5014 in response to the upward swipe gesture (not an upward edge swipe gesture) by contact 5026 that is detected on the background 5008 that is not covered by any card in the application switching user interface. In some embodiments, the application launching user interface is a home screen user interface that includes application icons and/or widgets displayed in a predetermined arrangement (e.g., an arrangement that is independent of the relative recency of when applications that were last used for at least some of the applications). In some embodiments, the application launching user interface is an application drawer user interface that includes application icons displayed in a predetermined arrangement. In some embodiments, an application icon is an icon which, when activated (e.g., by a tap gesture on the icon), launches a corresponding application (e.g., causes the device to open the application and displays a default starting user interface of the application). In some embodiments, the recently used applications are open applications. As used in the specification and claims, the term "open application" refers to a software application with retained state information (e.g., as part of device/global internal state 157 and/or application internal state 192). An open application is any one of the following types of applications: an active application, which is currently displayed on display 112 (or a corresponding application view is currently displayed on the display); a background application (or background process), which is not currently displayed on display 112, but one or more application processes (e.g., instructions) for the corresponding application are being processed by one or more processors 120 (i.e., running); a suspended application, which is not currently running, and the application is stored in a volatile memory (e.g., DRAM, SRAM, DDR RAM, or other volatile random access solid state memory device of memory 102); and a hibernated application, which is not running, and the application is stored in a non-volatile memory (e.g., one or more magnetic disk storage devices, optical disk storage devices, flash memory devices, or other non-volatile solid state storage devices of memory 102). As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

In some embodiments, while detecting the touch gesture: the device determines (6018) that the contact (e.g., contact 5018 or contact 5024 in FIG. 5E) has been detected initially at a location that corresponds to a respective application representation (e.g., the settings application or the maps application as shown in FIG. 5E). In response to determining that the contact has been detected initially at the location that corresponds to the respective application representation, enlarging the respective application representation. This is illustrated in FIG. 5H and FIG. 5M, for example, where the device enlarges cards 5012 and 5010, respectively, when detecting contact 5018 and 5024, respectively. Enlarging a particular application representation provides visual feedback to the user indicating that the contact in the touch gesture is at a location that will cause the electronic device to perform an operation associated with the particular application representation. Providing improved feedback enhances the operability of the device and makes the user-device interface more efficient (e.g., by helping the user to provide proper inputs and reducing user mistakes when operating/interacting with the device).

In some embodiments, in response to detecting the touch gesture by the contact (6010), in accordance with a determination that the touch gesture started on a respective application representation (e.g., the first application representation or the second application representation) and the touch gesture ended (e.g., after liftoff of the contact or after a predetermined timeout) with the contact (e.g., contact 5018) having moved less than a threshold amount from a starting position of the contact on the touch-sensitive surface, the device replaces display of the application switching user interface with a user interface (e.g., a full-screen user interface) for the respective application (e.g., the settings application). This is illustrated in FIGS. 5U-5V and 5Z following FIG. 5E, where a downward swipe gesture (e.g., a short downward swipe that does not pass a threshold position on the touch-screen) on card 5018 causes the device to display user interface 5022 of the settings application in full-screen mode. This is also illustrated in FIG. 5L following FIG. 5E, where a tap gesture by contact 5018 causes the device to display the settings application and ceases to display the application switching user interface. Navigating to a particular application with a stationary gesture, instead of closing the particular application with a moving gesture, provides additional operations that can be performed in the application switching user interface. Providing additional control options without cluttering the user interface with additional displayed controls enhances the operability of the device and makes the user-device interface more efficient (e.g., by helping the user to provide proper inputs and reducing user mistakes when operating/interacting with the device).

In some embodiments, in method 6000, in response to detecting the touch gesture by the contact (6010), in accordance with a determination that the touch gesture includes movement of the contact in a second direction that is different from (e.g., opposite to) the first direction, the device maintains (6022) display of the application switching user interface. In any of the processes shown in FIGS. 5F, 5H-5J, 5M-5N, 5Q-5S, 5U-5W, following FIG. 5E, if the movement of the contact (e.g., contact 5018, 5024, or 5026) reverses to its starting location (or within a threshold distance of the starting location) and then lifts off, the device restores display of the application switching user interface into the configuration shown in FIG. 5E. Maintaining the application switching user interface in response to the contact moving in a different direction from the first direction provides a way for a user to avoid or cancel performing an operation that would have occurred if the contact had continued moving in the first direction. Providing additional control options without cluttering the user interface with additional displayed controls (e.g., an undo or cancel icon) enhances the operability of the device and makes the user-device interface more efficient (e.g., by helping the user to provide proper inputs and reducing user mistakes when operating/interacting with the device).

In some embodiments, in response to detecting the touch gesture by the contact (e.g., contact 5018), in accordance with a determination that the touch gesture starts at a location corresponding to a respective application representation (e.g., card 5012) and includes movement of the contact in a second direction (e.g., downward) that is different from (e.g., opposite to) the first direction, the device replaces (6024) display of the application switching user interface with the user interface for the respective application, where the user interface for the respective application is shifted in a predefined direction (e.g., downward so that a top of the user interface for the respective application is closer to a bottom edge of the electronic device). This is illustrated in FIGS. 5U-5X following FIG. 5E, where a downward swipe gesture by contact 5018 on card 5012 causes the device to display the user interface of the settings application in an enhanced-reachability mode (e.g., half-way shifted downward on the touch-screen). Navigating to a particular application with its user interface shifted (e.g., downward), in response to a moving gesture in one direction (e.g., downward), to make it easier for a user to interact with the particular application with one-handed operation (e.g., via improved reachability for controls at the top of the user interface of the particular application), instead of closing the particular application with a moving gesture in a different direction (e.g., upward), provides additional operations that can be performed in the application switching user interface. Providing additional control options without cluttering the user interface with additional displayed controls enhances the operability of the device and makes the user-device interface more efficient (e.g., by helping the user to provide proper inputs and reducing user mistakes when operating/interacting with the device).

In some embodiments, displaying the user interface for the respective application shifted in the predefined direction includes (6026) removing the user interface for the respective application from a predefined portion of the display (e.g., the top portion of the touch-screen does not display any portion of the user interface 5022, and displays a portion of background 5008 instead, as shown in FIG. 5X). In method 600, while displaying the user interface for the respective application shifted in the predefined direction, the device detects a gesture (e.g., a drag gesture by contact 5036 or 5038) at a location corresponding to the predefined portion of the display (e.g., a drag gesture that starts at a location on the touch-sensitive surface that corresponds to a dragging affordance (such as chevron 5030 in FIG. 5X) that is displayed in or with the shifted user interface for the respective application). The device shifts the user interface (e.g., user interface 5022) for respective application back into the predefined portion of the display in accordance with the gesture (e.g., gradually moving the application back into the predefined portion of the display as the gesture progresses). This is illustrated in FIGS. 5X-5Y (e.g., showing upward swipe gesture on the tab 5030 causing the device to exit of the enhanced-reachability mode), for example. This is also illustrated in FIG. 5Z following FIG. 5X (e.g., showing upward swipe gesture from the bottom edge of the touch-screen causing the device to exit the enhanced-reachability mode), for example.

In some embodiments, in response to detecting a tap gesture in the predefined portion of the display while displaying the user interface for the respective application shifted in the predefined direction, the device shifts the user interface for respective application back into the predefined portion of the display. This is illustrated in FIG. 5Z following FIG. 5X (e.g., showing a tap gesture by contact 5034 causing the device to exit the enhanced-reachability mode), for example. Shifting the user interface of an application back to its unshifted position (e.g., where the application is displayed full-screen on the display) in response to another gesture enables a user to interact with the lower portion of the user interface, which had been shifted off-screen to enable a user to interact with the upper portion of the user interface using one-handed operation. Providing additional control options without cluttering the user interface with additional displayed controls enhances the operability of the device and makes the user-device interface more efficient (e.g., by helping the user to provide proper inputs and reducing user mistakes when operating/interacting with the device).

In some embodiments, in response to detecting the touch gesture (6010), in accordance with a determination that the touch gesture includes movement by the contact in a third direction (e.g., leftward or rightward) that is different from (e.g., perpendicular to) the first direction, the device maintains (6028) display of the application switching user interface and scrolls through application representations that are displayed in the application switching user interface (e.g., without regard to a duration of the contact on the touch-sensitive surface prior to detecting movement of the contact in the third direction). This is illustrated in FIGS. 5E-5G, for example, where a rightward swipe gesture by contact 5018 scrolls the cards in the application switching user interface, revealing new cards deeper in the stack of cards representing recently used applications. Scrolling through application representations with a moving gesture in a third direction (e.g., rightward or leftward), instead of closing a particular application with a moving gesture in the first direction (e.g., upward), displays additional application representations for selection in the application switching user interface. Providing additional control options without cluttering the user interface with additional displayed controls enhances the operability of the device and makes the user-device interface more efficient (e.g., by helping the user to provide proper inputs and reducing user mistakes when operating/interacting with the device).

In some embodiments, in response to detecting the touch gesture (6010), in accordance with a determination that the touch gesture started at a location that corresponds to a respective application representation and includes movement of the contact, the device moves (6030) the respective application representation in accordance with the movement of the contact (e.g., on a touch-sensitive display, moving the application representation upward if the contact moves upward across the display, moving the application representation downward if the contact moves downward across the display, moving the application representation leftward if the contact moves leftward across the display, and/or moving the application representation rightward if the contact moves rightward across the display). This is illustrated in FIGS. 5F, 5I, 5N, 5U-5W, for example. Moving a particular application representation in accordance with the movement of a contact provides visual feedback to the user indicating that the touch gesture will cause the electronic device to perform an operation associated with the particular application representation. Providing improved feedback enhances the operability of the device and makes the user-device interface more efficient (e.g., by helping the user to provide proper inputs and reducing user mistakes when operating/interacting with the device).

In some embodiments, in response to detecting the touch gesture (6010): in accordance with a determination that the touch gesture started at a location that corresponds to a respective application representation (e.g., the first or second application representation) and includes movement of the contact in the first direction, the device moves (6032) the respective application representation in the first direction without moving other application representations in the first direction (e.g., as illustrated in FIGS. 5I-5J) (e.g., the amount of movement of the respective application increases as the amount of movement of the contact in the first direction increases); and in accordance with a determination that the touch gesture started at a location that corresponds to a location outside of the predefined region and includes movement of the contact in the first direction, concurrently moving the respective application representation and one or more other applications representations in the first direction. (e.g., as illustrated in FIGS. 5Q-5R) (e.g., the amount of movement of the respective application and the one or more other application representations increases as the amount of movement of the contact in the first direction increases). Moving just a particular application representation in the first direction, without moving other application representations in the first direction, provides visual feedback to the user indicating that an operation will just be performed on the application that corresponds to the particular application representation (e.g., closing the corresponding application without closing the other open applications). Concurrently moving multiple application representations in the first direction provides visual feedback to the user indicating that an operation will be performed that is not specific to a particular application (e.g., going to the home screen user interface). Providing improved feedback enhances the operability of the device and makes the user-device interface more efficient (e.g., by helping the user to provide proper inputs and reducing user mistakes when operating/interacting with the device).

In some embodiments, in response to detecting the touch gesture (6010): in accordance with a determination that the touch gesture started at a location that corresponds to a respective application representation (e.g., the first or second application representation) and includes movement of the contact in the first direction, the device moves (6034) the respective application representation without changing a size of the respective application representation in accordance with the movement of the contact in the first direction (e.g., as illustrated in FIGS. 5I-5J, where the size of card 5012 remains constant during upward movement caused by contact 5018); and in accordance with a determination that the touch gesture started at a location that corresponds to a location outside of the predefined region and includes movement of the contact in the first direction, the device concurrently moves the respective application representation and changes a size (e.g., enlarging or reducing a size) of the respective application representation in accordance with the movement of the contact in the first direction (e.g., the amount of change in size of the respective application representation increases as the amount of movement of the contact in the first direction increases) (e.g., as illustrated in FIGS. 5Q-5R, where the size of card 5012 shrinks when being dragged upward by contact 5026). In some embodiments, the device concurrently changes the size of one or more other application representations in accordance with the movement of the contact in the first direction. For example, as illustrated in FIGS. 5Q-5R, the size of the cards 5010, 5012, and 5016 change in unison during the upward movement of the cards caused by movement of contact 5026. Moving a particular application representation in the first direction, without changing its size, provides visual feedback to the user indicating that an operation will be performed on the application that corresponds to the particular application representation (e.g., closing the corresponding application without closing the other open applications). Moving multiple application representations in the first direction, while changing their size, provides visual feedback to the user indicating that an operation will be performed that is not specific to a particular application (e.g., going to the home screen user interface). Providing improved feedback enhances the operability of the device and makes the user-device interface more efficient (e.g., by helping the user to provide proper inputs and reducing user mistakes when operating/interacting with the device).

In some embodiments, the application switching user interface includes (6036) a plurality of application representations that overlap with each other (e.g., as shown in FIG. 5E, cards 5010, 5012, and 5016 overlap one another). In method 6000, in response to detecting the touch gesture (6010): in accordance with a determination that the touch gesture started at a location that corresponds to a respective application representation (e.g., the first or second application representation) and includes movement of the contact in the first direction, the device moves (6038) the respective application representation while maintaining at least a portion of the overlapping of the plurality of application representations (e.g., as illustrated in FIGS. 5I-5J, where card 5012 continues to overlap with cards 5010 and 5016 during its upward movement); and in accordance with a determination that the touch gesture started at a location that corresponds to a location outside of the predefined region and includes movement of the contact in the first direction, the device moves the respective application representation and moves and/or resizes one or more of the application representations to eliminate overlap between the plurality of application representations (e.g., as illustrated in FIGS. 5Q-5I, cards 5012, 5010, and 5016 are spread apart and resized, and moves upward in parallel without any overlap). Moving a particular application representation in the first direction, while maintaining the overlap of at least some of the other application representations, provides visual feedback to the user indicating that an operation will be performed on the application that corresponds to the particular application representation (e.g., closing the corresponding application without closing the other open applications). Moving and/or resizing multiple application representations to eliminate the overlap between the application representations provides visual feedback to the user indicating that an operation will be performed that is not specific to a particular application (e.g., going to the home screen user interface). Providing improved feedback enhances the operability of the device and makes the user-device interface more efficient (e.g., by helping the user to provide proper inputs and reducing user mistakes when operating/interacting with the device).

It should be understood that the particular order in which the operations in FIGS. 6A-6D have been described is merely one example and is not intended to indicate that the described order is the only order in which the operations could be performed. One of ordinary skill in the art would recognize various ways to reorder the operations described herein. In some embodiments, one or more operations of method 6000 are combined, supplemented, or replaced with one or more operations of other methods described herein.

The operations described above with reference to FIGS. 6A-6D are, optionally, implemented by components depicted in FIGS. 1A-1B. For example, displaying operations 6002, 6006, and 6016, the detecting operations 6004 and 6008, and the closing operations 6012 and 6014, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device 100) corresponds to a predefined event or sub-event, such as selection of an object on a user interface, or rotation of the device 100 from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with a touch-sensitive surface and a display:
displaying, on the display, an application;
while displaying the application on the display, detecting an input that corresponds to a request to display an application switching user interface;
in response to detecting the input that corresponds to the request to display the application switching user interface, displaying an application switching user interface that includes representations of a plurality of recently used applications, including a first application representation that corresponds to a first application and a second application representation that corresponds to a second application;
while displaying the application switching user interface, detecting a touch gesture by a contact on the touch-sensitive surface; and,
in response to detecting the touch gesture:
in accordance with a determination that the touch gesture includes movement by the contact in a first direction and started at a location that corresponds to the first application representation, closing the first application;
in accordance with a determination that the touch gesture includes movement by the contact in the first direction and started at a location that corresponds to the second application representation, closing the second application; and,
in accordance with a determination that the touch gesture includes movement by the contact in the first direction and started at a location that corresponds a predefined region in the application switching user interface that is outside of the first application representation and the second application representation, ceasing to display the application switching user interface and displaying an application launching user interface that is different from the application switching user interface.

2. The method of claim 1, including:
while detecting the touch gesture:
determining that the contact has been detected initially at a location that corresponds to a respective application representation; and,
in response to determining that the contact has been detected initially at the location that corresponds to the respective application representation, enlarging the respective application representation.

3. The method of claim 1, including:
in response to detecting the touch gesture by the contact:
in accordance with a determination that the touch gesture started on a respective application representation and the touch gesture ended with the contact having moved less than a threshold amount from a starting position of the contact on the touch-sensitive surface, replacing display of the application switching user interface with a user interface for the respective application.

4. The method of claim 1, including:
in response to detecting the touch gesture by the contact:
in accordance with a determination that the touch gesture includes movement of the contact in a second direction that is different from the first direction, maintaining display of the application switching user interface.

5. The method of claim 1, including:
in response to detecting the touch gesture by the contact:
in accordance with a determination that the touch gesture starts at a location corresponding to a respective application representation and includes movement of the contact in a second direction that is different from the first direction, replacing display of the application switching user interface with the user interface for the respective application, where the user interface for the respective application is shifted in a predefined direction.

6. The method of claim 5, wherein displaying the user interface for the respective application shifted in the predefined direction includes removing the user interface for the respective application from a predefined portion of the display, and the method includes:
while displaying the user interface for the respective application shifted in the predefined direction, detecting a gesture at a location corresponding to the predefined portion of the display; and
shifting the user interface for respective application back into the predefined portion of the display in accordance with the gesture.

7. The method of claim 1, including:
in response to detecting the touch gesture:
in accordance with a determination that the touch gesture includes movement by the contact in a third direction that is different from the first direction, maintaining display of the application switching user interface and scrolling through application representations that are displayed in the application switching user interface.

8. The method of claim 1, including:
in response to detecting the touch gesture:
in accordance with a determination that the touch gesture started at a location that corresponds to a respective application representation and includes movement of the contact, moving the respective application representation in accordance with the movement of the contact.

9. The method of claim 1, including:
in response to detecting the touch gesture:
in accordance with a determination that the touch gesture started at a location that corresponds to a respective application representation and includes movement of the contact in the first direction, moving the respective application representation in the first direction without moving other application representations in the first direction; and,
in accordance with a determination that the touch gesture started at a location that corresponds to a location outside of the predefined region and includes movement of the contact in the first direction, concurrently moving the respective application representation and one or more other applications representations in the first direction.

10. The method of claim 1, including:
in response to detecting the touch gesture:
in accordance with a determination that the touch gesture started at a location that corresponds to a respective application representation and includes movement of the contact in the first direction, moving the respective application representation without changing a size of the respective application representation in accordance with the movement of the contact in the first direction; and
in accordance with a determination that the touch gesture started at a location that corresponds to a location outside of the predefined region and includes movement of the contact in the first direction, concurrently moving the respective application representation and changing a size of the respective application representation in accordance with the movement of the contact in the first direction.

11. The method of claim 1, wherein the application switching user interface includes a plurality of application representations that overlap with each other; and
the method includes:
in response to detecting the touch gesture:
in accordance with a determination that the touch gesture started at a location that corresponds to a respective application representation and includes movement of the contact in the first direction, moving the respective application representation while maintaining at least a portion of the overlapping of the plurality of application representations; and
in accordance with a determination that the touch gesture started at a location that corresponds to a location outside of the predefined region and includes movement of the contact in the first direction, moving the respective application representation and moving and/or resizing one or more of the application representations to eliminate overlap between the plurality of application representations.

12. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying, on the display, an application;
while displaying the application on the display, detecting an input that corresponds to a request to display an application switching user interface;
in response to detecting the input that corresponds to the request to display the application switching user interface, displaying an application switching user interface that includes representations of a plurality of recently used applications, including a first application representation that corresponds to a first application and a second application representation that corresponds to a second application;
while displaying the application switching user interface, detecting a touch gesture by a contact on the touch-sensitive surface; and,
in response to detecting the touch gesture:
in accordance with a determination that the touch gesture includes movement by the contact in a first direction and started at a location that corresponds to the first application representation, closing the first application;
in accordance with a determination that the touch gesture includes movement by the contact in the first direction and started at a location that corresponds to the second application representation, closing the second application; and,
in accordance with a determination that the touch gesture includes movement by the contact in the first direction and started at a location that corresponds a predefined region in the application switching user interface that is outside of the first application representation and the second application representation, ceasing to display the application switching user interface and displaying an application launching user interface that is different from the application switching user interface.

13. The electronic device of claim 12, wherein the one or more programs include instructions for:
while detecting the touch gesture:
determining that the contact has been detected initially at a location that corresponds to a respective application representation; and,
in response to determining that the contact has been detected initially at the location that corresponds to the respective application representation, enlarging the respective application representation.

14. The electronic device of claim 12, wherein the one or more programs include instructions for:
in response to detecting the touch gesture by the contact:
in accordance with a determination that the touch gesture started on a respective application representation and the touch gesture ended with the contact having moved less than a threshold amount from a starting position of the contact on the touch-sensitive surface, replacing display of the application switching user interface with a user interface for the respective application.

15. The electronic device of claim 12, wherein the one or more programs include instructions for:
in response to detecting the touch gesture by the contact:
in accordance with a determination that the touch gesture includes movement of the contact in a second direction that is different from the first direction, maintaining display of the application switching user interface.

16. The electronic device of claim 12, wherein the one or more programs include instructions for:
in response to detecting the touch gesture by the contact:
in accordance with a determination that the touch gesture starts at a location corresponding to a respective application representation and includes movement of the contact in a second direction that is different from the first direction, replacing display of the application switching user interface with the user interface for the respective application, where the user interface for the respective application is shifted in a predefined direction.

17. The electronic device of claim 16, wherein displaying the user interface for the respective application shifted in the predefined direction includes removing the user interface for the respective application from a predefined portion of the display, and the one or more programs include instructions for:
while displaying the user interface for the respective application shifted in the predefined direction, detecting a gesture at a location corresponding to the predefined portion of the display; and
shifting the user interface for respective application back into the predefined portion of the display in accordance with the gesture.

18. The electronic device of claim 12, wherein the one or more programs include instructions for:
in response to detecting the touch gesture:
in accordance with a determination that the touch gesture includes movement by the contact in a third direction that is different from the first direction, maintaining display of the application switching user interface and scrolling through application representations that are displayed in the application switching user interface.

19. The electronic device of claim 12, wherein the one or more programs include instructions for:
in response to detecting the touch gesture:
in accordance with a determination that the touch gesture started at a location that corresponds to a respective application representation and includes movement of the contact, moving the respective application representation in accordance with the movement of the contact.

20. The electronic device of claim 12, wherein the one or more programs include instructions for:
in response to detecting the touch gesture:
in accordance with a determination that the touch gesture started at a location that corresponds to a respective application representation and includes movement of the contact in the first direction, moving the respective application representation in the first direction without moving other application representations in the first direction; and,
in accordance with a determination that the touch gesture started at a location that corresponds to a location outside of the predefined region and includes movement of the contact in the first direction, concurrently moving the respective application representation and one or more other applications representations in the first direction.

21. The electronic device of claim 12, wherein the one or more programs include instructions for:
in response to detecting the touch gesture:
in accordance with a determination that the touch gesture started at a location that corresponds to a respective application representation and includes movement of the contact in the first direction, moving the respective application representation without changing a size of the respective application representation in accordance with the movement of the contact in the first direction; and
in accordance with a determination that the touch gesture started at a location that corresponds to a location outside of the predefined region and includes movement of the contact in the first direction, concurrently moving the respective application representation and changing a size of the respective application representation in accordance with the movement of the contact in the first direction.

22. The electronic device of claim 12, wherein the application switching user interface includes a plurality of application representations that overlap with each other; and
the one or more programs include instructions for:
in response to detecting the touch gesture:
in accordance with a determination that the touch gesture started at a location that corresponds to a respective application representation and includes movement of the contact in the first direction, moving the respective application representation while maintaining at least a portion of the overlapping of the plurality of application representations; and
in accordance with a determination that the touch gesture started at a location that corresponds to a location outside of the predefined region and includes movement of the contact in the first direction, moving the respective application representation and moving and/or resizing one or more of the application representations to eliminate overlap between the plurality of application representations.

23. A non-transitional computer readable storage medium storing one or more programs, the one or more programs comprising instructions, which when executed by an electronic device with a display, a touch-sensitive surface, cause the device to:
display, on the display, an application;
while displaying the application on the display, detect an input that corresponds to a request to display an application switching user interface;
in response to detecting the input that corresponds to the request to display the application switching user interface, display an application switching user interface that includes representations of a plurality of recently used applications, including a first application representation that corresponds to a first application and a second application representation that corresponds to a second application;
while displaying the application switching user interface, detect a touch gesture by a contact on the touch-sensitive surface; and, in response to detecting the touch gesture:
in accordance with a determination that the touch gesture includes movement by the contact in a first direction and started at a location that corresponds to the first application representation, close the first application;
in accordance with a determination that the touch gesture includes movement by the contact in the first direction and started at a location that corresponds to the second application representation, close the second application; and,
in accordance with a determination that the touch gesture includes movement by the contact in the first direction and started at a location that corresponds a predefined region in the application switching user interface that is outside of the first application representation and the second application representation, cease to display the application switching user interface and displaying an application launching user interface that is different from the application switching user interface.

24. The non-transitory computer readable storage medium of claim 23, the one or more programs comprising instructions which, when executed by the electronic device, cause the electronic device to:
while detecting the touch gesture:
determine that the contact has been detected initially at a location that corresponds to a respective application representation; and,
in response to determining that the contact has been detected initially at the location that corresponds to the respective application representation, enlarge the respective application representation.

25. The non-transitory computer readable storage medium of claim 23, the one or more programs comprising instructions which, when executed by the electronic device, cause the electronic device to:
in response to detecting the touch gesture by the contact:
in accordance with a determination that the touch gesture started on a respective application representation and the touch gesture ended with the contact having moved less than a threshold amount from a starting position of the contact on the touch-sensitive surface, replace display of the application switching user interface with a user interface for the respective application.

26. The non-transitory computer readable storage medium of claim 23, the one or more programs comprising instructions which, when executed by the electronic device, cause the electronic device to:
in response to detecting the touch gesture by the contact:
in accordance with a determination that the touch gesture includes movement of the contact in a second direction that is different from the first direction, maintain display of the application switching user interface.

27. The non-transitory computer readable storage medium of claim 23, the one or more programs comprising instructions which, when executed by the electronic device, cause the electronic device to:
in response to detecting the touch gesture by the contact:
in accordance with a determination that the touch gesture starts at a location corresponding to a respective application representation and includes movement of the contact in a second direction that is different from the first direction, replace display of the application switching user interface with the user interface for the respective application, where the user interface for the respective application is shifted in a predefined direction.

28. The non-transitory computer readable storage medium of claim 27, wherein displaying the user interface for the respective application shifted in the predefined direction includes removing the user interface for the respective application from a predefined portion of the display, and the one or more programs comprising instructions which, when executed by the electronic device, cause the electronic device to:
while displaying the user interface for the respective application shifted in the predefined direction, detect a gesture at a location corresponding to the predefined portion of the display; and
shift the user interface for respective application back into the predefined portion of the display in accordance with the gesture.

29. The non-transitory computer readable storage medium of claim 23, the one or more programs comprising instructions which, when executed by the electronic device, cause the electronic device to:
in response to detecting the touch gesture:
in accordance with a determination that the touch gesture includes movement by the contact in a third direction that is different from the first direction, maintain display of the application switching user interface and scrolling through application representations that are displayed in the application switching user interface.

30. The non-transitory computer readable storage medium of claim 23, the one or more programs comprising instructions which, when executed by the electronic device, cause the electronic device to:
in response to detecting the touch gesture:
in accordance with a determination that the touch gesture started at a location that corresponds to a respective application representation and includes movement of the contact, move the respective application representation in accordance with the movement of the contact.

31. The non-transitory computer readable storage medium of claim 23, the one or more programs comprising instructions which, when executed by the electronic device, cause the electronic device to:
in response to detecting the touch gesture:
in accordance with a determination that the touch gesture started at a location that corresponds to a respective application representation and includes movement of the contact in the first direction, move the respective application representation in the first direction without moving other application representations in the first direction; and,
in accordance with a determination that the touch gesture started at a location that corresponds to a location outside of the predefined region and includes movement of the contact in the first direction, concurrently move the respective application representation and one or more other applications representations in the first direction.

32. The non-transitory computer readable storage medium of claim 23, the one or more programs comprising instructions which, when executed by the electronic device, cause the electronic device to:
in response to detecting the touch gesture:
in accordance with a determination that the touch gesture started at a location that corresponds to a respective application representation and includes movement of the contact in the first direction, move the respective application representation without changing a size of the respective application representation in accordance with the movement of the contact in the first direction; and in accordance with a determination that the touch gesture started at a location that corresponds to a location outside of the predefined region and includes movement of the contact in the first direction, concurrently move the respective application representation and changing a size of the respective application representation in accordance with the movement of the contact in the first direction.

33. The non-transitory computer readable storage medium of claim 23, wherein the application switching user interface includes a plurality of application representations that overlap with each other; and the one or more programs comprising instructions which, when executed by the electronic device, cause the electronic device to:

in response to detecting the touch gesture:

in accordance with a determination that the touch gesture started at a location that corresponds to a respective application representation and includes movement of the contact in the first direction, move the respective application representation while maintaining at least a portion of the overlapping of the plurality of application representations; and in accordance with a determination that the touch gesture started at a location that corresponds to a location outside of the predefined region and includes movement of the contact in the first direction, move the respective application representation and moving and/or resizing one or more of the application representations to eliminate overlap between the plurality of application representations.

* * * * *

UNITED STATES PATENT AND TRADEMARK OFFICE
CERTIFICATE OF CORRECTION

PATENT NO. : 10,976,917 B2  
APPLICATION NO. : 16/859902  
DATED : April 13, 2021  
INVENTOR(S) : Alonso Ruiz et al.

Page 1 of 1

It is certified that error appears in the above-identified patent and that said Letters Patent is hereby corrected as shown below:

In the Specification

Column 42, Line 35, please delete "on card 5018 causes" and insert --on card 5012 causes--;

In the Claims

Claim 1, Column 48, Lines 6-7, please delete "that corresponds a" and insert --that corresponds to a--;

Claim 9, Column 49, Line 27, please delete "other applications" and insert --other application--;

Claim 12, Column 50, Lines 41-42, please delete "that corresponds a" and insert --that corresponds to a--;

Claim 20, Column 52, Line 4, please delete "other applications" and insert --other application--;

Claim 23, Column 52, Line 47, please delete "non-transitional computer" and insert --non-transitory computer--;

Claim 23, Column 52, Line 50, please delete "with a display, a touch-sensitive" and insert --with a display and a touch-sensitive--;

Claim 23, Column 53, Line 14, please delete "that corresponds a" and insert --that corresponds to a--;

Claim 31, Column 54, Line 59, please delete "other applications" and insert --other application--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*